US012650779B2

(12) United States Patent
Zhou et al.

(10) Patent No.: US 12,650,779 B2
(45) Date of Patent: Jun. 9, 2026

(54) METHOD AND SYSTEM OF MANAGING MEMORY USAGE IN A DATA LEARNING OPERATION

(71) Applicant: Lemon Inc., Grand Cayman (KY)

(72) Inventors: Jin Zhou, Los Angeles, CA (US); Tongping Liu, Los Angeles, CA (US); Yong Fu, Los Angeles, CA (US); Ping Zhou, Los Angeles, CA (US); Wei Xu, Los Angeles, CA (US); Jianjun Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 12 days.

(21) Appl. No.: 18/512,191

(22) Filed: Nov. 17, 2023

(65) Prior Publication Data

US 2024/0118818 A1     Apr. 11, 2024

(51) Int. Cl.
 *G06F 3/06* (2006.01)
 *G06N 3/045* (2023.01)
 (Continued)

(52) U.S. Cl.
 CPC .......... *G06F 3/0631* (2013.01); *G06F 3/0616* (2013.01); *G06F 3/064* (2013.01);
 (Continued)

(58) Field of Classification Search
 CPC ...... G05B 13/00–048; G05B 15/00–02; G05B 17/00–02; G06F 1/00–3296;
 (Continued)

(56) References Cited

U.S. PATENT DOCUMENTS

| | | | |
|---|---|---|---|
| 6,546,548 B1 * | 4/2003 | Berry .................. | G06F 11/3466 |
| | | | 717/128 |
| 2020/0042859 A1 * | 2/2020 | Mappouras ............ | G06N 3/048 |

(Continued)

OTHER PUBLICATIONS

Angel-PTM: A Scalable and Economical Large-scale Pre-training System in Tencent; Xiaonan Nie et al.; Mar. 6, 2023; retrieved from https://arxiv.org/abs/2303.02868v1 and https://arxiv.org/pdf/2303.02868v1 (Year: 2023).*

(Continued)

*Primary Examiner* — Daniel C. Chappell
(74) *Attorney, Agent, or Firm* — Fish & Richardson P.C.

(57) ABSTRACT

Methods and systems for managing memory usage in data learning operations. The method includes profiling one or more objects used for training in the data learning operation, in which the profiling includes determining an object size, a memory allocation timestamp, and a memory deallocation timestamp; and scheduling the memory usage. The scheduling includes grouping the one or more objects into the one or more groups based on the memory allocation and/or the memory deallocation timestamp of the one or more objects, and arranging the one or more objects in the one or more groups in descending order in a memory space. Two or more objects are provided in the descending order in the memory space, in which one of the objects having an earliest memory allocation timestamp is provided at a first value and the other object having a later memory allocation timestamp is provided at a second value.

13 Claims, 13 Drawing Sheets

200

205

222   224   226

| Profiling Phase | → | Object Classification | → | Object Assignment | → | Object Mapping | → | Execution Phase |

Scheduling Phase

230

220

(51) Int. Cl.

| | |
|---|---|
| *G06N 3/08* | (2023.01) |
| *G06N 3/084* | (2023.01) |
| *G06N 5/04* | (2023.01) |
| *G06N 5/046* | (2023.01) |

(52) U.S. Cl.
CPC .............. *G06N 3/045* (2023.01); *G06N 3/08* (2013.01); *G06N 3/084* (2013.01); *G06N 5/042* (2013.01); *G06N 5/046* (2013.01); *G06F 3/0679* (2013.01)

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 2020/0097845 | A1* | 3/2020 | Shaikh | G06Q 30/0201 |
| 2020/0125941 | A1* | 4/2020 | Gold | G06F 3/067 |
| 2025/0165173 | A1* | 5/2025 | Chernyak | G06F 11/14 |

OTHER PUBLICATIONS

Ehsan Yousefzadeh-Asl-Miandoab et al. May 8, 2023. Profiling and Monitoring Deep Learning Training Tasks. In Proceedings of the 3rd Workshop on Machine Learning and Systems (EuroMLSys '23). Association for Computing Machinery, New York, NY, USA, 18-25. https://doi.org/10.1145/3578356.3592589 (Year: 2023).*

J. Will, L. Thamsen, J. Bader, D. Scheinert and O. Kao, "Get Your Memory Right: The Crispy Resource Allocation Assistant for Large-Scale Data Processing," 2022 IEEE International Conference on Cloud Engineering (IC2E), CA, USA, 2022, pp. 58-66, doi: 10.1109/IC2E55432.2022.00014. (Year: 2000).*

J. Li, C. Zhang, Q. Cao, C. Qi, J. Huang and C. Xie, "An Experimental Study on Deep Learning Based on Different Hardware Configurations," 2017 International Conference on Networking, Architecture, and Storage (NAS), Shenzhen, China, 2017, pp. 1-6, doi: 10.1109/NAS.2017.8026843. (Year: 2017).*

* cited by examiner

METHOD AND SYSTEM OF MANAGING MEMORY USAGE IN A DATA LEARNING OPERATION

FIELD

The embodiments described herein pertain generally to managing data storage in a data learning operation, such as, training in a data learning operation, e.g., training a machine learning model. More specifically, the embodiments described herein pertain to methods and systems of managing memory usage in a data learning operation, such as, for training a machine learning model in a distributed training and/or fine-tuning system.

BACKGROUND

Memory management for training a machine learning model has been a continuous focus in the machine learning field, since each processing unit, e.g., a graphics processing unit (GPU) or central processing unit (CPU), has limited memory capacity. As the data used for training the machine learning model increases, e.g., training hundreds of billions of parameters, memory management is a critical challenge, even when distributed systems are used to collaborate together to train the machine learning model.

SUMMARY

Features in the embodiments disclosed herein may support data learning operations by reducing and/or optimizing memory consumption and/or reducing computational overhead for data learning operations, e.g., operations included in training a machine learning model, by improving the management of memory usage. The memory management mechanism as discussed herein may be used in deep learning architectures, for example, for natural language processing, computer vision, audio processing, multi-modal processing, generative pre-trained architectures, or directional encoder representations from transformers, in which during the training of machine learning models, input data, model parameters, forward activations, backward gradients, optimizer states, may use processing device memory.

Features in the embodiments disclosed herein may include the memory management mechanism that includes a profiling-based memory allocation algorithm that utilizes information about allocated objects, that is obtained in advance through profiling, for training machine learning parameters of the machine learning model. Such memory management mechanism may solve issues of existing solutions by reducing memory consumption by using the profiling to collect at least size, memory allocations and memory deallocations, e.g., via timestamps, of the objects for training the machine learning model. The memory management mechanism may further include a scheduling step that uses the profiled information to determine the size and address range of a memory allocation, e.g., block in the machine learning model, and subsequently the total consumption of memory usage, e.g., GPU memory, may be determined that is optimized to reduce memory consumption. The scheduling step may then be applied to any subsequent allocation, e.g., execution steps or blocks used for training the machine learning model. As such, not only may the memory allocation algorithm include memory management that may be optimized by reducing memory consumption, for example, by avoiding memory fragmentation, but also may reduce the computational overhead by applying the same allocation information or parameters for a single allocation (or block) for any subsequent allocation, e.g., execution steps or blocks for training the machine learning model. In some embodiments, the profiling-based memory allocation algorithm may be a parallel-ladder algorithm that is designed, programmed, or otherwise configured to balance memory consumption and computation complexity that results in less memory consumption as compared with existing sub-optimal algorithms.

In one example embodiment, a method of managing memory usage in a data learning operation is provided. The method includes profiling one or more objects used for training the data learning operation, in which the profiling includes determining an object size, a memory allocation timestamp, and a memory deallocation timestamp of the one or more objects; and scheduling the memory usage for the one or more objects to determine a total size and address range for one or more groups of the one or more objects. The scheduling includes: grouping the one or more objects into the one or more groups based on the memory allocation timestamp and/or the memory deallocation timestamp of the one or more objects, and arranging the one or more objects in the one or more groups in descending order in a memory space, in which, when the one or more objects includes two or more objects, the two or more objects are provided in the descending order from a first value to a second value, that is less than the first value, in the memory space, in which one of the two or more objects having an earliest memory allocation timestamp is provided at the first value and an other object of the two or more objects having a later memory allocation timestamp is provided at the second value.

In another embodiment, a method of managing memory usage in a data learning operation is provided. The method includes profiling a batch of objects, each of the objects including a size, an allocation timestamp, and a deallocation timestamp; and arranging the profiled batch of objects in a memory space to form a combined memory address range corresponding to the batch of objects. The arranging includes determining, based on the deallocation timestamp, whether a deallocation of one object of the batch of objects occurs after another one of the objects of the batch of objects, and rearranging an order of the arranged batch of objects when the deallocation occurs such that memory usage for the combined memory address range of the batch of objects is maximized for the batch of objects in the memory space.

In still another embodiment, a data learning operation training system is provided. The system includes a memory to store a data learning operation; at least one processor to: profile one or more objects used for training the data learning operation, wherein the profiling includes determining an object size, a memory allocation timestamp, and a memory deallocation timestamp of the one or more objects; and schedule a memory usage for the one or more objects to determine a total size and address range for one or more groups of the one or more objects. The scheduling includes: grouping the one or more objects into the one or more groups based on the memory allocation timestamp and/or the memory deallocation timestamp of the one or more objects, and arranging the one or more objects in the one or more groups in descending order in a memory space, in which, when the one or more objects includes two or more objects, the two or more objects are provided in the descending order from a first value to a second value, that is less than the first value, in the memory space, wherein one of the two or more objects having an earliest memory allocation timestamp is provided at the first value and an other object of the two or more objects having a later memory allocation timestamp is provided at the second value.

In yet another example embodiment, a non-transitory computer-readable medium having computer-executable instructions stored thereon is provided. The instructions, upon execution, cause one or more processors to perform operations include profiling one or more objects used for training the data learning operation, in which the profiling includes determining an object size, a memory allocation timestamp, and a memory deallocation timestamp of the one or more objects; and scheduling the memory usage for the one or more objects to determine a total size and address range for one or more groups of the one or more objects. The scheduling includes: grouping the one or more objects into the one or more groups based on the memory allocation timestamp and/or the memory deallocation timestamp of the one or more objects, and arranging the one or more objects in the one or more groups in descending order in a memory space, wherein, when the one or more objects includes two or more objects, the two or more objects are provided in the descending order from a first value to a second value, that is less than the first value, in the memory space, wherein one of the two or more objects having an earliest memory allocation timestamp is provided at the first value and an other object of the two or more objects having a later memory allocation timestamp is provided at the second value.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIGS. 7A-7I are schematic illustrations of a method for managing memory usage using a profiling-based memory allocation algorithm, in accordance with at least some embodiments described herein.

DETAILED DESCRIPTION

Figure 1:
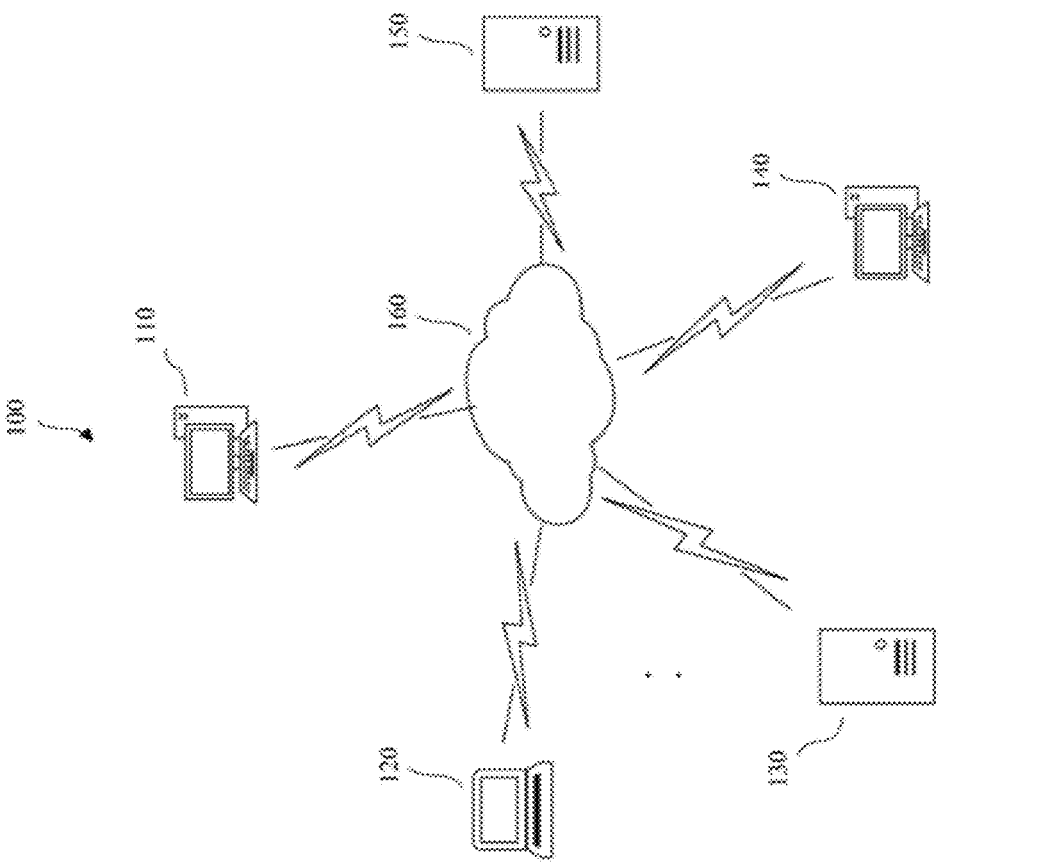
FIG. 1 is a schematic view of an example memory management system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional processing block components and various processing steps. It should be appreciated that such functional processing blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "machine learning" or "data learning" is a term of art and may refer to a computer or processor-related technology by which decisions and/or actions are autonomously made, learned, and/or trained, in place of human intervention. Machine learning is a branch of artificial intelligence which focuses on the use of data and algorithms to imitate the way that humans learn, gradually improving its accuracy. Machine learning may include software, i.e., algorithms and/or programs, hardware or firmware, or any combination thereof that supports machine learning, natural language understanding, natural language processing, speech recognition, computer vision, etc. Also included among the range of machine learning functions and capabilities, and pertinent to the embodiments disclosed, recited, and suggested herein, training and/or fine-tuning of a machine learning model.

As referenced herein, a "model" or "machine learning model" is a term of art and may refer to software, such as algorithms and/or programs, hardware or firmware, or any combination thereof that supports machine learning, natural language understanding, natural language processing, speech recognition, computer vision, etc. In an example embodiment, the process of training a model involves providing a machine learning algorithm (e.g., a learning algorithm, etc.) with training data to learn from, and the machine learning model may refer to the model artifact that is created by the training process.

As referenced herein, a "parameter" of a model or a "model parameter" is a term of art and may refer to a configuration variable that is internal to the model and whose value may be estimated from the given data. Model parameters are required by the model when making predictions, and model parameters may determine how the input data is transformed into the desired output. In an example embodiment, "weight" is a model parameter that transforms input data within the (hidden) layers of the model, and/or that represents a strength of the connection between units or nodes of the model. In an example embodiment, "bias" is a model parameter that represents the amount that a model's prediction differs from the target value, compared to the training data.

As referenced herein, a "forward" propagation, pass, or operation is a term of art and may refer to a function, operation, or algorithm to obtain or generate the actual output of the machine learning model. In an example embodiment, in a forward operation, input data may be fed to the model in a forward direction, e.g., by propagating the input data to an input layer, going through hidden layer(s) and successive layer(s), measuring the model's predictions from the output layer, and calculating the model error based on the predictions the model made. As referenced herein, a "backpropagation" or "backward" propagation, pass, or operation is a term of art and may refer to a function, operation, or algorithm to traverse the model in a reverse sequence, from the output layer (going through the hidden layer(s) and the successive layer(s)) to the input layer, and to calculate the gradient with respect to the model parameters. In an example embodiment, in a backward operation, the flow is reversed (from the forward operation) by e.g., propagating the error to the output layer until reaching the input layer passing through the hidden layer(s). It is to be understood that one "training step" or "fine-tuning step" is a term of art and may refer to a process that includes at least a forward operation and a backward operation based on a batch of input data.

As referenced herein, a "model execution step" may refer to one or a single training or fine-tuning step of executing the training of a machine learning model (using training data or non-training data), e.g., to gather or obtain the required or desired information or data regarding to the normal training execution of the model, such as e.g., status, execution sequence or timestamp, execution phase (e.g., in forward operation phase or backward operation phase, etc.), a hookable attribute, or the like, of a tensor and/or its module, the relationship between a tensor and its module, memory usage of each execution phase, etc. It is to be understood that the model execution step is for gathering or obtaining the required or desired information or data regarding the execution of the model, instead of for optimizing, training, or fine-tuning the model.

As referenced herein, an "optimizer" is a term of art and may refer to a function or algorithm that modifies the attributes or parameters (e.g., weights, learning rates, etc.) of a machine learning process, method, or model. In an example embodiment, the optimizer may help in reducing the overall loss and improving accuracy, minimizing an error function (e.g., a loss function, etc.), and/or maximizing the efficiency of production.

As referenced herein, an "alive" object or "aliveness" of an object may refer to a lifetime of an object, e.g., between an allocation timestamp and deallocation timestamp of the object.

As referenced herein, a "long-lived object" may refer to objects that have a lifetime beyond different stages or layers. In some embodiments, a long-lived object may be an object allocated in the forward stage but only deallocated in the backward stage. In some embodiments, the long-lived object may be an object allocated in a backward stage but not deallocated in the same layer.

As referenced herein, an "ordinary object" may refer to objects not classified as long-lived objects. In some embodiments, an ordinary object may be an object that is allocated and deallocated in the same stage or layer.

As referenced herein, the term "object" is a term of art and may refer to one or more of data, variables, data structures, functions, code, or the like and/or may contain one or more of a value, references/identifiers, attributes, etc.

Features in the embodiments disclosed herein may support data learning operations by reducing and/or optimizing memory consumption and/or reducing computational overhead for data learning operations, e.g., operations included in training a machine learning model, by improving the management of memory usage. The memory management mechanism as discussed herein may be used in deep learning architectures, for example, for natural language processing, computer vision, audio processing, multi-modal processing, generative pre-trained architectures, or directional encoder representations from transformers, in which during the training of machine learning models, input data, model parameters, forward activations, backward gradients, optimizer states, may use processing device memory.

Features in the embodiments disclosed herein may include the memory management mechanism that includes a profiling-based memory allocation algorithm that utilizes information about allocated objects, that is obtained in advance through profiling, for training machine learning parameters of the machine learning model. Such memory management mechanism may solve issues of existing solutions by reducing memory consumption by using the profiling to collect at least size, memory allocations and memory deallocations, e.g., via timestamps, of the objects for training the machine learning model. The memory management mechanism may further include a scheduling step that uses the profiled information to determine the size and address range of a memory allocation, e.g., block in the machine learning model, and subsequently the total consumption of memory usage, e.g., GPU memory, may be determined that is optimized to reduce memory consumption. The scheduling step may then be applied to any subsequent allocation, e.g., execution steps or blocks used for training the machine learning model. As such, not only may the memory allocation algorithm include memory management that may be optimized by reducing memory consumption, for example, by avoiding memory fragmentation, but also may reduce the computational overhead by applying the same allocation information or parameters for a single allocation (or block) for any subsequent allocation, e.g., execution steps or blocks for training the machine learning model. In some embodiments, the profiling-based memory allocation algorithm may be a parallel-ladder algorithm that is designed, programmed, or otherwise configured to balance memory consumption and computation complexity that results in less memory consumption as compared with existing sub-optimal algorithms.

As such, the methods and systems as discussed herein may have one or more of the following advantages:

Reduce computation overhead by exploiting similarities between layers or blocks of the machine learning model, e.g., models that utilize the transformer architecture; classifying objects as ordinary objects and long-lived objects, which may interfere with memory assignment; and grouping ordinary objects in small groups of objects and grouping the long-lived objects in groups at a time during a scheduling phase.

Reduce memory consumption by ordering objects based on allocation timestamps and deallocation timestamps to optimize the assignment of the objects based on allocations/deallocations to maximize memory usage.

Reduce "out of memory" (OOM) occurrences and/or memory waste by using a suboptimal memory allocation algorithm that is designed, programmed, or otherwise configured to balance the computation overhead and memory consumption, for example, by managing objects in terms of memory blocks, and freeing the memory blocks back to the processing device as necessary for optimized memory assignment (or usage).

Avoidance of memory fragmentation by reusing (releasing) memory as a contiguous memory space to maximize memory availability, e.g., for larger object sizes. For example, if a contiguous memory space is not available, once the first object is deallocated, its space may not be immediately reused if an adjacent object is still active, e.g., memory fragmentation.

Balance computational overhead and memory consumption by using a suboptimal memory allocation algorithm or process that applies allocation information for one block to other blocks for training the machine learning model, e.g., for a significant number of allocations in which the size and the address of each allocation does not have to be determined.

FIG. 1 is a schematic view of an example memory management system in a data learning system 100, arranged in accordance with at least some embodiments described herein.

The system 100 may include devices 110, 120, 130, 140, 150, and a network 160. It is to be understood that FIG. 1 only shows illustrative numbers of the devices and/or the network. The embodiments described herein are not limited to the number of the devices and/or the network described. That is, the number of devices and/or networks described herein are provided for descriptive purposes only and are not intended to be limiting.

In accordance with at least some example embodiments, the devices 110, 120, 130, 140, and 150 may be various electronic devices. The various electronic devices may include but not be limited to a mobile device such as a smartphone, a tablet computer, an e-book reader, a laptop computer, a desktop computer, a server, and/or any other suitable electronic devices.

In accordance with at least some example embodiments, the network 160 may be a medium used to provide a communications link among the devices 110, 120, 130, 140, and 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, one or more of the devices 110, 120, 130, 140, and 150 may be a server for providing various services to users using one or more of other devices. The server may be implemented by a distributed server cluster including multiple servers or may be implemented by a single server.

A user may use one or more of the devices 110, 120, 130, 140, and 150 to interact with each other via the network 160. Various applications or localized interfaces thereof, such as social media applications, online shopping services, dataset operation services, machine learning services, or the like, may be installed on the devices 110, 120, 130, 140, and 150.

It is to be understood that software applications or services according to the embodiments described herein and/or according to the services provided by the service providers may be performed by the devices 110, 120, 130, 140, and 150. Accordingly, the apparatus for the software applications and/or services may be arranged in the devices 110, 120, 130, 140, and 150.

It is also to be understood that when a service is not performed remotely, the system 100 may not include the network 160, but include only the device 110, 120, 130, 140, and/or 150.

It is further to be understood that the devices 110, 120, 130, 140, and 150 may each include one or more processors, a memory, and a storage device storing one or more programs. The devices 110, 120, 130, 140, and/or 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 4:
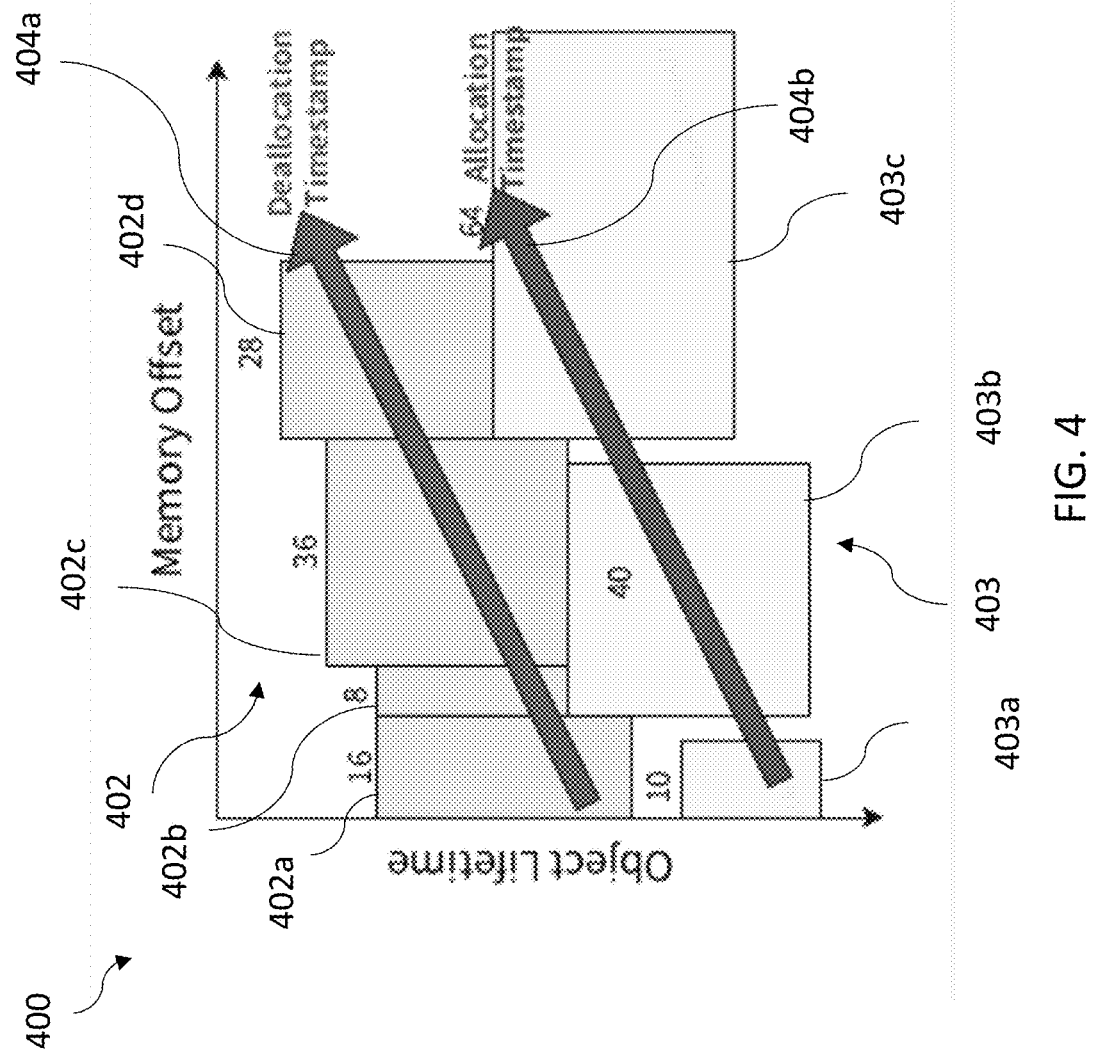
FIG. 4 is a schematic illustration of a profiling-based memory allocation algorithm, arranged in accordance with at least some embodiments described herein.

It is further to be understood that in the embodiments described herein, a device may refer to a computer system (e.g., 110, 120, 130, 140, 150, etc.) that includes at least a CPU, a GPU, and/or a combination thereof (see also the description of FIG. 4).

Figure 2:
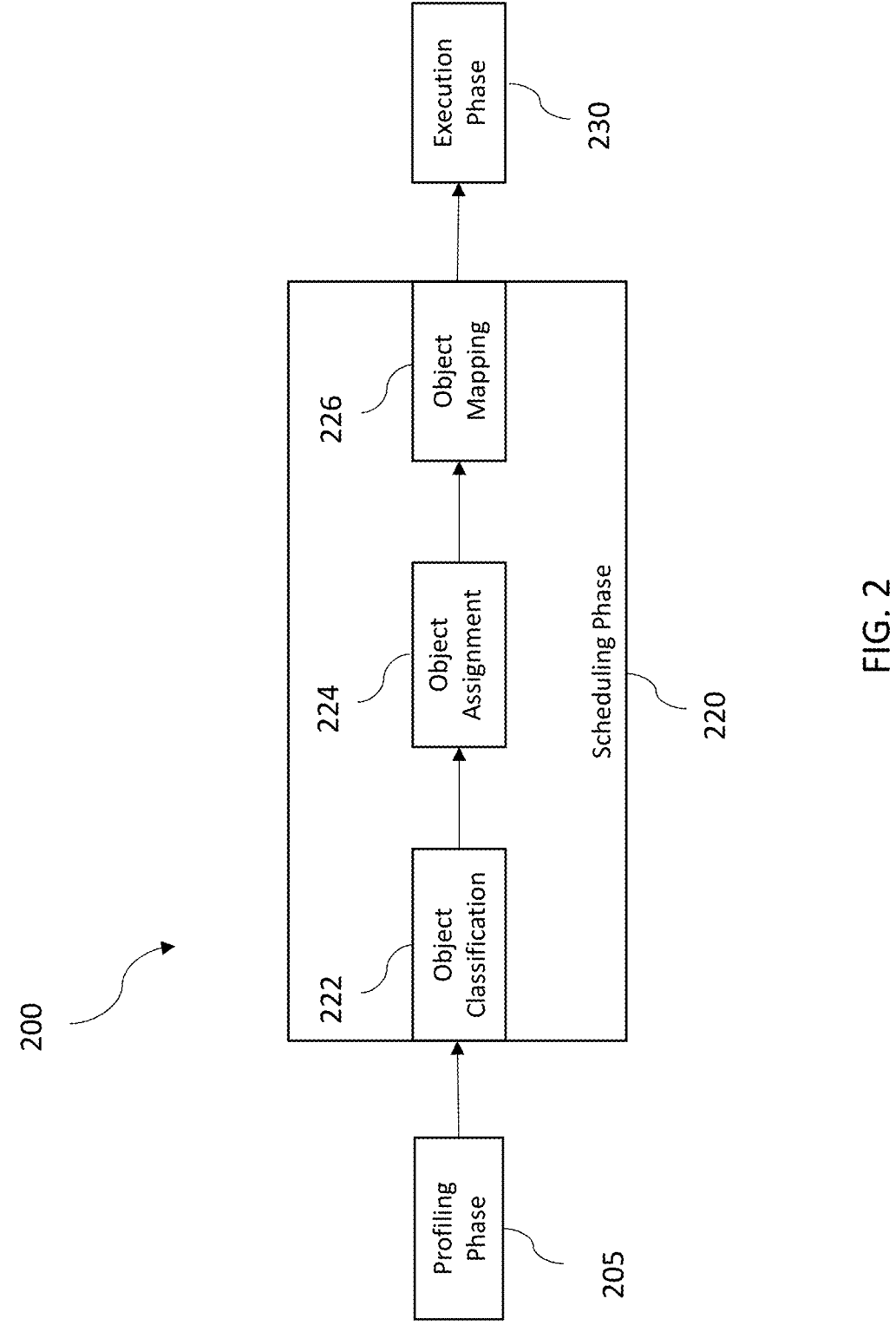
FIG. 2 is a schematic view of an example processing flow for managing memory usage for training a machine learning model, arranged in accordance with at least some embodiments described herein.

FIG. 2 is a schematic view of an example processing flow 200 to manage memory usage in a data learning operation, e.g., for training a machine learning model or operation therein, arranged in accordance with at least some embodiments described herein.

It is to be understood that training a model may refer to learning or determining desired or optimal model parameters (e.g., weight, bias, etc.) based on training data, e.g., based on one or more objects or batch of objects for one or more data allocations. Fine-tuning a model may refer to an approach to transfer learning in which the model parameters (e.g., weight, etc.) of a pre-trained model are trained on new training data, e.g., one or more objects or batch of objects. Optimizing a model may refer to training and/or fine-tuning a model.

Figure 8:
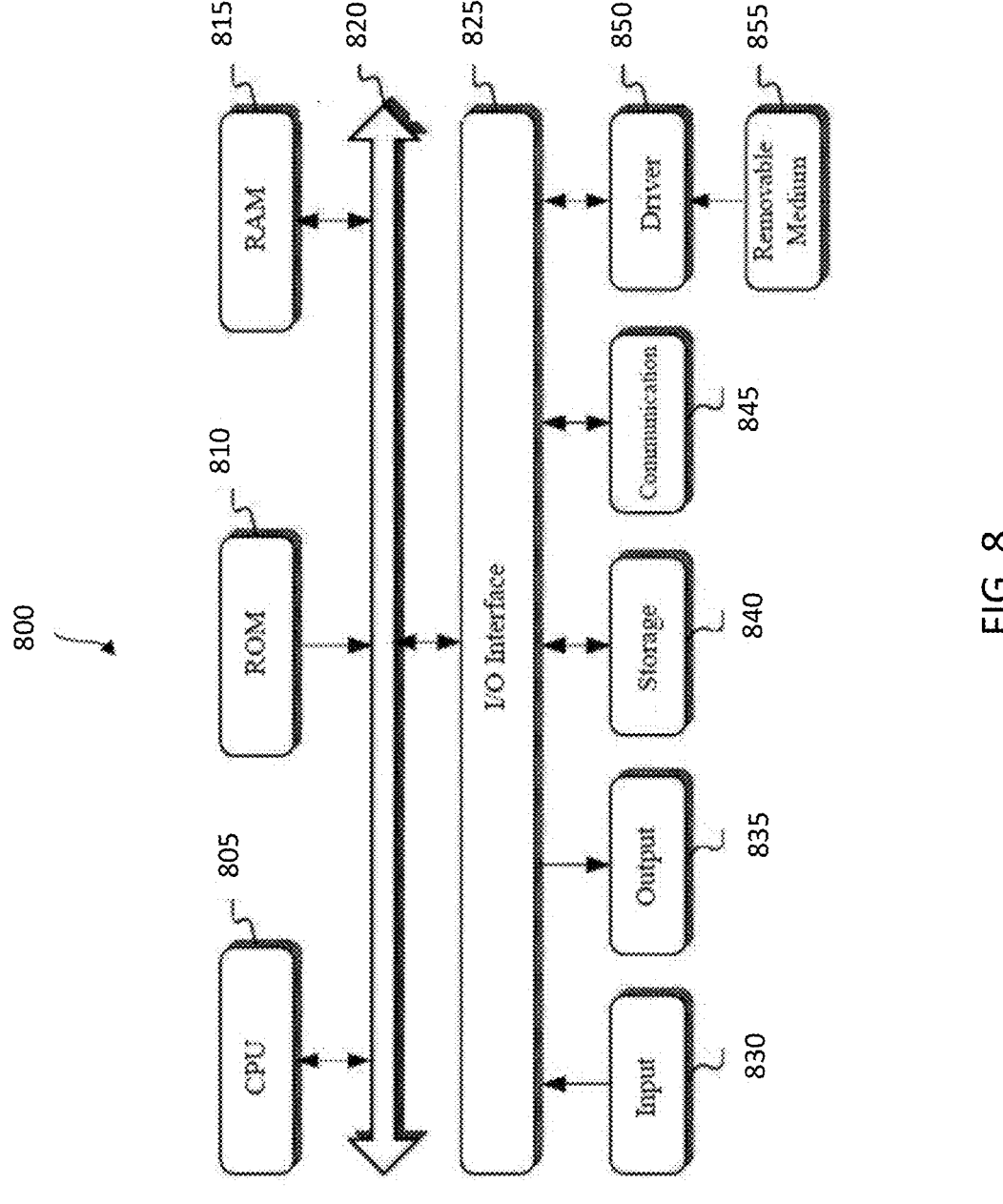
FIG. 8 is a schematic structural diagram of an example computer system applicable to implementing an electronic device, arranged in accordance with at least some embodiments described herein.

It is to be understood that the processing flow 200 disclosed herein may be conducted by one or more processors (e.g., the processor of one or more of the device 110, 120, 130, 140, and 150 of FIG. 1, the CPU or GPU 805 of FIG. 8, and/or any other suitable processor), unless otherwise specified.

It is also to be understood that the processing flow 200 may include one or more operations, actions, or functions as illustrated by one or more of processing blocks 205, 220, 222, 224, 226, and 230. These various operations, functions, or actions may, for example, correspond to software, program code, or program instructions executable by a processor that causes the functions to be performed. Although illustrated as discrete processing blocks, obvious modifications may be made, e.g., two or more of the processing blocks may be re-ordered; further processing blocks may be added; and various blocks may be divided into additional processing blocks, combined into fewer processing blocks, or eliminated, depending on the desired implementation. It is to be understood that before the processing flow 200, operations including initializations or the like may be performed. For example, system parameters and/or application parameters may be initialized.

The processing flow 200 may include a profiling-based memory allocation algorithm, such as, a parallel-ladder algorithm, that is designed, programmed, or otherwise configured to balance memory consumption and computation complexity. In some embodiments, the processing flow 200 may include a profiling step or phase 205, a scheduling step or phase 220, and an execution step or phase 230. During the profiling step or phase 205, the processing flow 200 may collect a size, a lifetime, and order of memory allocation and deallocations of one or more objects or batch of objects. The lifetime of the object may be based on when the object is allocated and deallocated, e.g., based on timestamps and how long the object remains in memory. During the scheduling step or phase 220, the processing flow 200 may schedule the memory usage for the allocation and determine the size and the address range for each memory allocation, e.g., group of objects provided for training one block (or allocation) of the machine learning model, and subsequently a total consumption of memory for the block (or allocation), e.g., based on the total memory assignment of the one or more objects or batch of objects. As used herein, the term "block" may be a term of art that refers to a neural network block, e.g., a transformer block, that may be a single layer or multiple layers in the machine learning model. During the execution step or phase 230, the processing flow 200 may apply the schedule of the memory assignment, e.g., allocation information, determined at 220 and apply the same to subsequent execution phases, e.g., one or more blocks of the machine learning algorithm, such as, subsequent transformer building blocks, which may be scaled dot-product attention units. In some embodiments, only a single profiling step or phase 205 and single scheduling step or phase 220 may be provided during an entire training process for the machine learning model, since the same amount of memory may be used in the subsequent phases or blocks, e.g., since memory usage may be deterministic. As such, the profiling step or phase 205 and the single scheduling step or phase 220 may be utilized or applied to any subsequent blocks or layers, e.g., transformer blocks, for the training of the machine learning model, e.g., during the execution step or phase 230. For example, when the machine learning model is based on a transformer architecture, e.g., having an encoder and a decoder, each containing multiple blocks, in which each block includes a self-attention mechanism followed by a feed-forward neural network, the processing flow 200 is designed, programmed, or otherwise configured to only use the allocation information or pattern of a first block in the forward stage or phase and a first block in the backward stage or phase determined in the scheduling step or phase 220 for any other blocks (or layers) in the transformer architecture. That is, since in some embodiments, the different blocks in the machine learning model may have the same allocation and/or deallocation pattern, the allocation information or pattern of a single block (e.g., from profiling and scheduling) may be used or applied for the scheduling of other blocks to reduce the number of allocations in the scheduling step or phase.

That is, in some embodiments, the processing flow 200 having the profiling-based memory allocation algorithm may be designed, programmed, or otherwise configured to reduce computation overhead and/or to reduce memory consumption. For example, in some embodiments, the computation overhead may be reduced by exploiting similarities between layers of the machine learning model, e.g., by utilizing or applying the allocation information from a first block, to reduce the number of allocations in the scheduling step or phase 220. For instance, for a machine learning model with 100 blocks, e.g., transformer blocks, the number of allocations may be reduced by approximately 198 times, e.g., 99*2, compared to machine learning models that considers all allocations (or blocks) (in both the forward and backward stages or phases). Moreover, computation overhead may be reduced by consideration object classifications between ordinary objects and long-lived objects, in which only ordinary objects may be considered for object mapping, but using the profiling-based memory allocation algorithm separately grouping the ordinary objects and the long-lived objects and the scheduling of the same. Furthermore, the ordinary objects may be divided into small groups, e.g., based on allocation times, and the small group of objects are considered at a time in the scheduling step or phase 220, as discussed further below.

Moreover, in some embodiments, memory consumption may be reduced by having the processing flow 200 having the profiling-based memory allocation algorithm be designed, programmed, or otherwise configured to arrange and/or rearrange objects in one or more groups to reduce memory consumption caused by allocations and deallocations, as further discussed below.

Referring back to FIG. 2, at processing block 205 (Profiling), the processor may be designed, programmed, or otherwise configured to perform a profiling step or phase for the machine learning model. In an example embodiment, the profiling step or phase 205 may include the profiling for a single training or fine-tuning step of performing at least a forward operation and/or a backward operation on a single block for the machine learning model, e.g., a single allocation or transformer block. It is also to be understood that profiling results (to be described in detail below) from the profiling step or phase may include the same or substantially the same allocation information for all of the blocks or layers of the machine learning model, e.g., any remaining or subsequent blocks after a first training step.

It is to be understood that the profiling step or phase (processing block 205) of the processing flow 200 is to gather or obtain the detailed information or data of each object allocated in a first training step, e.g., of one or more objects or batch of objects. The gathered or obtained information or data (e.g., the profiling results from the profiling execution) may be utilized to guide memory allocation (and assignment) during the scheduling step or phase 220, e.g., by grouping one or more objects into one or more groups, and/or to guide the placement or arrangement of one or more objects inside the GPU memory or inside the CPU memory of the device, e.g., based on memory address ranges, allocation timestamps, deallocation timestamps, or the like.

In an example embodiment, the gathered or obtained information or data in the profiling step or phase 205 may include one or more of object size, e.g., of the one or more objects or each of the objects in the batch of objects; object allocation timestamps and deallocation timestamps (e.g., execution sequence), e.g., to determine whether any objects may overlap (conflict) during the execution step or phase; lifetime of the object, e.g., ordinary object or long-lived object; and/or stages (forward or backward, and the model layer being executed) when the object is allocated or deallocated. In some embodiments, the gathered or obtained information or data may be gathered or obtained during the profiling step or phase 205 by one or more of intercepting each memory allocation/deallocation call, e.g., in/for a memory allocator; collection of each object's allocation and deallocation timestamps with a global counting variable, e.g., incremental increasing the global variable at each call or event; or collection of stage information (forward/backward) by utilizing a hook or hook function for both the forward and backward stages, e.g., a function, operation, or algorithm that is executed or triggered when e.g., a condition is met. Processing may proceed from processing block 205 to processing block 220.

It is understood that the profiling step or phase 205 may be performed on a GPU or on a CPU. Performing the profiling step or phase 205 on a CPU may take much longer time than performing the profiling step or phase 205 on a GPU, and it may be difficult to determine the memory usage (e.g., increases, etc.) of the forward operation phase and the backward operation phase e.g., for model normal execution.

At processing block 220 (Scheduling), the processor (of each device) may be designed, programmed or otherwise configured to perform a scheduling step or phase 220 for the machine learning model. In an example embodiment, the processing flow 200 having the profiling-based memory allocation algorithm may include the scheduling to determine the total size of memory to be used, the address range of each object, and/or object assignment/scheduling for execution. The scheduling step or phase 220 may include as inputs, the size of the objects, allocation timestamp and deallocation timestamp of the objects, lifetime of the objects, and/or object classification. In an embodiment, the scheduling step or phase 220 may include one or more of object classification processing block 222, e.g., to classify objects of the same block into two or more types, memory management processing block 224 to group, assign, and/or schedule objects based on allocation timestamps and deallocation timestamps, and object mapping processing block 226 for object mapping for objects located in other blocks, e.g., other transformer blocks, of the machine learning model.

At processing block 222 (Object Classification), the processor having the profiling-based memory allocation algorithm may be designed, programmed, or otherwise configured to classify objects into two or more types, including, but not limited to long-lived objects and ordinary objects. In some embodiments, the long-lived objects and the ordinary objects may be grouped separately, e.g., in separate memory spaces. In some embodiments, the long-lived objects may be moved or placed into a different memory zone, e.g., not in the same memory zone (or usage) as the ordinary objects. In some embodiments, the long-lived objects may be pooled separately to avoid interference with the memory assignment (and/or allocation) of the ordinary objects. In some embodiments, the long-lived objects may be objects allocated in the forward stage but only deallocated in the backward stage, e.g., objects used for gradient checkpointing, or objects allocated in the backward stage but not deallocated in the same layer. In some embodiments, the ordinary objects are objects not classified as long-lived objects and/or objects that are allocated and deallocated in the same stage or layer. Processing may proceed from processing block 222 to processing block 224.

At processing block 224 (Object Assignment), the processor may be designed, programmed, or otherwise configured to utilize or apply the profiling-based memory allocation algorithm for object assignment to manage the memory usage. The object assignment may include the grouped long-lived objects and the grouped ordinary objects and/or include further grouping the ordinary objects, e.g., the one or more objects or from the batch of objects for a single block or layer, based on aliveness of last-allocation object, e.g., based on allocation timestamps and deallocation timestamps, ordering the objects according to the allocation order at first, e.g., based on allocation timestamps, and then moving, arranging, or swapping the order of the objects based on the deallocation order, e.g., based on deallocation timestamps, as further discussed below.

During the grouping of the ordinary objects, objects are placed, grouped, or arranged into one or more groups, in which objects having overlapping lifetimes, e.g., based on allocation timestamps and deallocation timestamps, are placed, grouped, or arranged in the same group, since objects having overlapping lifetimes cannot be allocated at the same time That is, based on the allocation timestamp, all objects that are alive, e.g., have an overlapping lifetime based on the allocation timestamp and deallocation timestamp, will be placed in the same group. The grouping may be repeated until all objects are grouped into a series of groups, e.g., G0 (youngest group), G1, . . . , GN (oldest group). In some embodiments, a maximum size of memory may be determined based on the maximum size of all groups, e.g., memory address occupied by all of the groups.

After the grouping, the processor may be designed, programmed, or otherwise configured to order, arrange, move, or place the objects in each group. In some embodiments, the ordering of the objects may start from the earliest group, which may ensure the assignment (or scheduling) of a later group does not conflict with the existing groups. In an example embodiment, the objects may be ordered based on their allocation timestamp in descending order, e.g., from the latest one to the earliest one, and placed in a memory space for scheduling, in which their memory addresses are provided from low to high. Such a configuration may allow the profiling-based memory allocation algorithm to adapt to a ladder configuration for allocations, e.g., to maximize memory usage based on the allocation/deallocation of objects.

In some embodiments, the processor may be designed, programmed, or otherwise configured to move, arrange, or swap the order of the objects based on the deallocation timestamps. In an embodiment, the objects inside the same group may be moved, arranged, or swapped according to the deallocation timestamps, if such moving, arranging, or swapping does not introduce a conflict with objects of a previous group. For example, in some embodiments, for any pair of objects A and B, if A is placed at the right of B but A is deallocated later than B, A may be swapped with B if the swap does not conflict, e.g., for allocation/deallocation, with objects in the last group. Further, in some embodiments, a memory offset gap may be reduced, moved, or eliminated after the moving, arranging, or swapping of the object, in which each object may be pushed to the left-most if possible, e.g., decrease, remove, or reduce memory offset in a memory address range in a memory space (for assignment or scheduling of memory usage), e.g., based on availability of memory in the memory space at the appropriate allocation time. Such a configuration may allow the profiling-based memory allocation algorithm to reduce external memory fragmentation caused by deallocation, e.g., by maximizing memory usage to minimize the combined memory address range of the objects.

As such, based on the arrangement (and/or rearrangement) of the objects in the memory space (for assignment or scheduling), the processing flow 200 including the profiling-based memory allocation algorithm may be designed, programmed, or otherwise configured to determine the total size of memory for all objects, e.g., of the one or more objects or batch of objects, as being the offset between the left-most and the right-most objects in the groups, e.g., based on the memory address position of the objects in the memory space, and scheduling (or assignment) of the allocation and deallocation of objects, e.g., based on the allocation timestamps and deallocation timestamps. After determining the total size of the memory, the processing flow 200 may then determine the address range for each object, where the object at the left-most address may set to be 0, which may be maximized for the memory space for the objects, e.g., based on allocation and deallocation timestamps and memory usage. Processing may proceed from processing block 224 to processing block 226.

At processing block 226 (Object Mapping), the processor may be designed, programmed, or otherwise configured to apply or utilize the same allocation rule (or information) for the one or more objects or group of objects for the first block (or allocation), e.g., a block 0, to any remaining or other blocks, e.g., block 1 to block (N) in the forward phase and/or the first block, e.g., block (N), to any remaining blocks, e.g., block (N–1) to block 0, in the backward stage, for the machine learning model.

Figure 3:
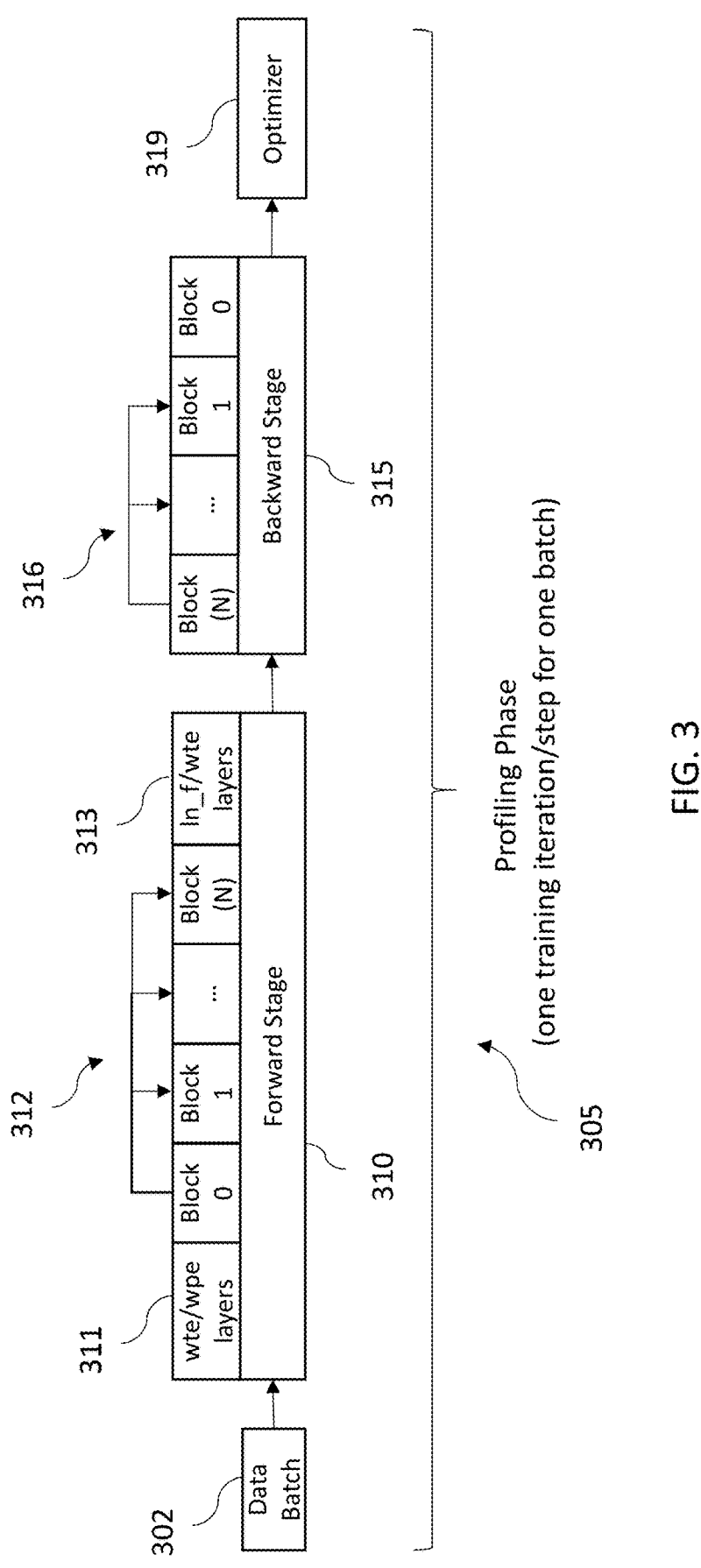
FIG. 3 is a schematic view of an example object mapping process, arranged in accordance with at least some embodiments described herein.

For example, FIG. 3 illustrates a schematic representation of an embodiment for an object mapping process that applies or utilizes the same allocation rule (or information) for the remaining blocks in the machine learning model. In an embodiment, the object mapping process may include a profiling step or phase 305 that may be performed for one training step or allocation for one batch of data and may include a data batch processing block 302 that includes receiving or inputting one or more objects or batch of objects, a forward stage 310, a backward stage 315, and an optimizer 319. The data batch processing block 302 may be a batch of training data for a single block. The batch of training data may include one or more objects or batch of objects that may be an input or data gathered or obtained by the processing flow, e.g., 200, for training the machine learning model. In some embodiments, each transformer block may include 100 objects, 1,000 objects, 10,000 objects, 100,000 objects, or the like, but not limited thereto. Rather, the number of objects depends on the number of objects for training one step (or allocation) of the machine learning model.

The forward stage 310 may be designed, programmed, or otherwise configured to obtain or generate the actual output of the machine learning model. In an example embodiment, in the forward stage 310, the data batch 302 may be fed to the machine learning model in a forward direction, e.g., by propagating the input data to an input layer, going through hidden layer(s) and successive layer(s), measuring the model's predictions from the output layer, and calculating the model error based on the predictions the model made. The forward stage 310 may include wte/wpe layers 311, blocks 312 0 . . . N, and ln_f/wte layers 313. The wte/wpe layers 311 may be token and/or positioning embedding layers, e.g., for transformer block architectures, that receive the data batch and encode the relationship between the token and positioning. The blocks 0 . . . N may be transformer blocks that may include encoder/decoder blocks for processing the input data, e.g., objects in the data batch, for the machine learning model. It is appreciated that as the machine learning models become more complex and larger, e.g., including millions, hundreds of millions, billions, etc. of parameters), a larger number of blocks may be used for training the model, e.g., 50 blocks, 100 blocks, 500 blocks, 1000 blocks, or the like. The ln_f/wte layers 313 may be normalization layers to normalize the inputs across each of the features, e.g., parameters of the machine learning model.

The backward stage 315 may be designed, programmed, or otherwise configured to receive the normalized inputs from the forward stage 310. In an example embodiment, during the backward stage, the machine learning model is traversed in a reverse sequence, from the output layer (going through the hidden layer(s) and the successive layer(s)) to the input layer, and to calculate a gradient with respect to the model parameters. In an example embodiment, in the backward stage, the flow is reversed (from the forward operation) by e.g., propagating the error to the output layer until reaching the input layer passing through the hidden layer(s).

The optimizer 319 may be designed, programmed, or otherwise configured to receive the results from the backward stage 315 (and/or forward stage 310) and modify the attributes or parameters (e.g., weights, learning rates, etc.) of the machine learning model. In an example embodiment, the optimizer may help in reducing the overall loss and improving accuracy, minimizing an error function (e.g., a loss function, etc.), and/or maximizing the efficiency of production.

As illustrated in FIG. 3, the processing flow, e.g., 200, may be designed, programmed, or otherwise configured to apply or utilize the same allocation rule (or information) for the one or more objects or group of objects for the first block, e.g., a block 0, to any remaining or other blocks, e.g., block 1 to block (N) in the forward phase and/or the first block, e.g., block (N), to any remaining blocks, e.g., block (N–1) to block 0, in the backward stage, for the machine learning model. That is, the processing flow 200 may be designed, programmed, or otherwise configured to leverage similarities, e.g., allocation information, between different blocks (or layers) in the machine learning model, for ordinary objects in the other blocks (or layers). Processing may proceed from processing block 226 to processing block 230.

At processing block 230 (Execution Phase), the processor may be designed, programmed, or otherwise configured to apply or execute the scheduling at subsequent execution steps or phases 230. In some embodiments, the execution phase may use the same address ranges of all objects determined during the profiling step or phase 205, in which the profiling and scheduling is only performed in the first step (or one allocation) for one batch of data, e.g., for block 0 in the forward phase or block (N) in the backward phase. That is, for the other training iterations of the machine learning model, the processor may be designed, programmed, or otherwise configured to follow the following procedures for all allocations and deallocations:

For each allocation request, the processor may be designed, programmed, or otherwise configured to use the stage, size, and lifetime, e.g., aliveness based on allocation timestamps and deallocation timestamps, as the identification so that the objects in the subsequent blocks (or allocations) may be mapped to the corresponding object(s) determined during the profiling step or phase and scheduling. That is, the starting address of this allocation will use the same one determined in the profiling phase. For each deallocation request, there is no need for any explicit operation, since the content of any object will be overwritten by later ones.

As such, the processing flow 200 may be designed, programmed, or otherwise configured to balance memory consumption and computational complexity. That is, in some embodiments, the processing flow 200 may include the profiling-based memory allocation algorithm to reduce computation overhead and/or to reduce memory consumption. For example, in some embodiments, the computation overhead may be reduced by exploiting similarities between layers of the machine learning model, e.g., by utilizing or applying the allocation information from a first block, to reduce the number of allocations in the scheduling step or phase 220. Moreover, computation overhead may be reduced by considering object classifications between ordinary objects and long-lived objects using the profiling-based memory allocation algorithm in which only the ordinary objects are object mapped, and the ordinary objects are grouped in small groups of objects and the long-lived objects are grouped in groups of objects and scheduled accordingly. Furthermore, the ordinary objects may be divided into further small groups, e.g., based on allocation times, and the small group of objects are considered at a time in the scheduling step or phase 220 to reduce computational complexity and maximize memory usage by reducing memory consumption, e.g., minimize the combined memory address range between the first allocation timestamp and the last deallocation timestamp.

Further details of a processing flow having a profiling-based memory allocation algorithm and scheduling of memory usage is discussed below.

FIG. 4 illustrates an example embodiment of a memory space 400 in which a first group of objects 402 and a second group of objects 403 are arranged according to a processing flow having a profiling-based memory allocation algorithm 400, e.g., a parallel ladder algorithm, as discussed herein. The first group of objects 402 includes the objects first arranged based on allocation timestamps, e.g., the top side of the objects 402a, 402b, 402c, 402d indicating the allocation time for the respective object, and then may be rearranged or moved based on deallocation timestamps, e.g., the bottom side of the objects 402a, 402b, 402c, 402d indicating the deallocation time for the respective object, e.g., along the object lifetime. The objects may be placed, arranged, or moved in a memory space of the processing device along a memory address range, e.g., having a memory offset which indicates the distance (or displacement) between the first object and last object of the group.

That is, objects in the same group, e.g., first group or second group, may be first ordered by respective allocation timestamps, where the earliest one (according to allocation timestamp) will be placed in the right-most place, e.g., at a memory address with the greatest memory offset, and so on. Then the objects may be ordered, e.g., re-ordered, moved, swapped, or rearranged, by respective deallocation timestamps, starting from the right side, as long as the re-ordering, moving, swapping, or rearranging does not conflict with the placement of objects in any previous groups.

For example, based on the allocation timestamps, for the first group of objects 402, e.g., group of objects that are allocated first or before another group of objects, object 402d with a size of 28 (KB, MB, GB, or the like) may be allocated first at a right-most position, e.g., in the memory space with the largest memory offset, since object 402d has an earliest allocation timestamp. Then object 402c with a size of 36 may be arranged, moved, or placed adjacent to the left of object 402d (in descending order of the memory offset), and then object 402b with a size of 8 and object 402a with a size 16 may be arranged, moved, or placed next to the left of object 402c, in descending order of the allocation timestamps. Next, objects 402a and 402b may be considered for rearranging, moving, swapping, or placing based on the deallocation timestamps. In an embodiment, since the deallocation time for object 402b is before the deallocation time for object 402a, object 402b may be placed to the right of object 402a, e.g., in the memory space having a greater memory offset, so that the memory may be freed up or released for subsequent use in a contiguous memory.

As such, as schematically illustrated in FIG. 4, objects in the first group may be organized as the ladder 404a (based on allocation/deallocation timestamps, as discussed above), while objects in the second group 403, or next group, may be organized as the ladder 404b (based on allocation timestamps (and/or deallocation timestamps)). For example, in some embodiments, since object 403c of the second group 403 has an earlier allocation timestamp, object 403c is arranged, moved, or placed at a position in the memory space along the memory address range farthest to the right-most place, e.g., greatest memory offset, at the associated allocation time. Subsequently, object 403b is arranged, moved, or placed at a position in the memory space along the memory address range that corresponds to the allocation time for object 403b that maximizes memory usage. Then, object 403a is arranged, moved, or placed at a position in the memory space along the memory address range at the associated allocation time, in which if there is a gap in the memory address range (e.g., a distance or value in the memory offset), object 403a is shifted along the memory address range to remove (or reduce) any memory offset, e.g., corresponds to position 0. Thus, by arranging, rearranging, placing, or moving objects in the groups based on the allocation and deallocation timestamps, less memory may be utilized compared to existing mechanisms to maximize memory usage, e.g., by reducing the memory address range (e.g., total size) of the memory space 400, for the scheduling step or phase (or memory usage assignment) and/or to form contiguous memory block(s) for reuse.

Figures 5A, 5B:
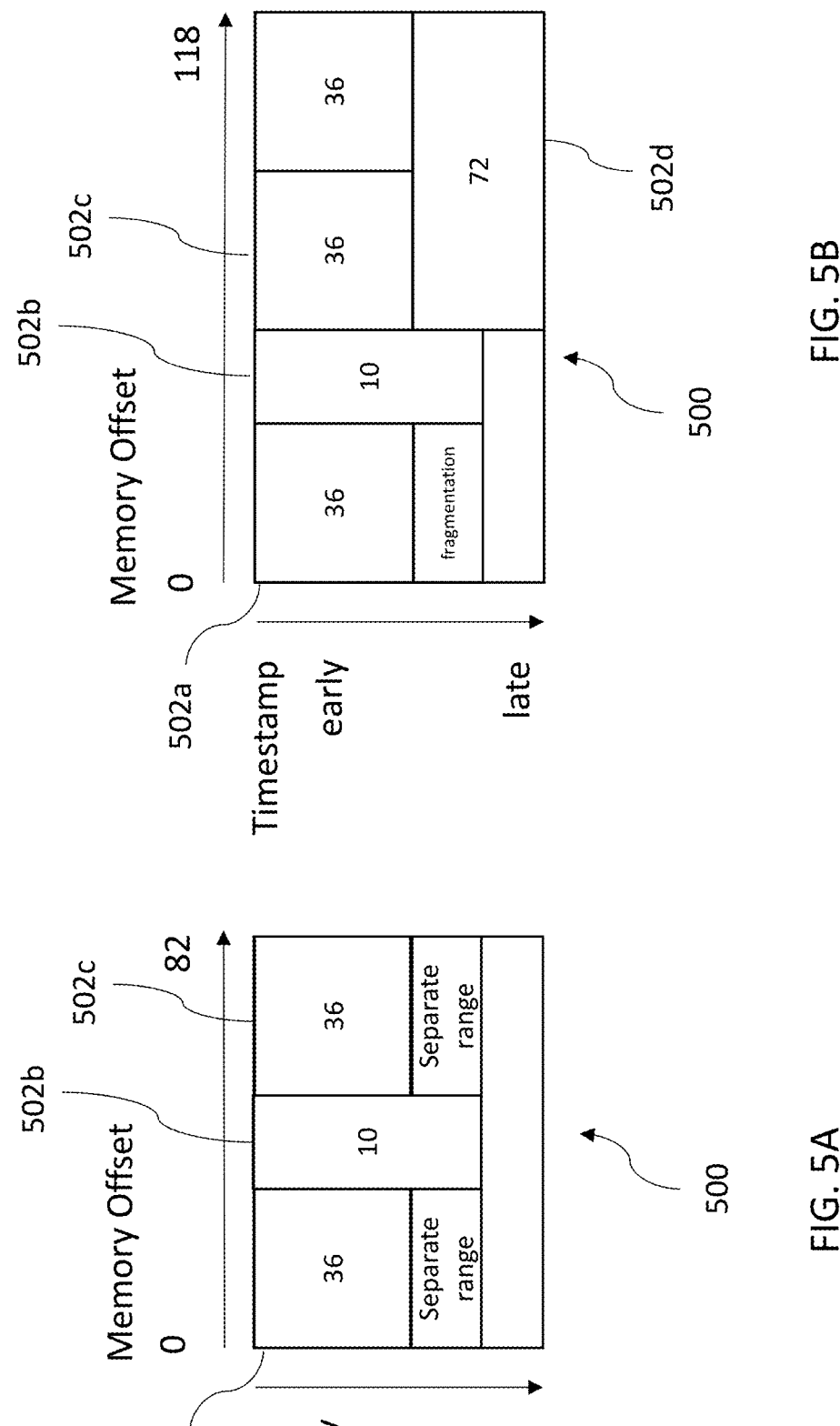
FIGS. 5A and 5B are schematic illustrations of a memory space including objects with overlapping lifetimes, in accordance with at least some embodiments described herein.

For example, FIGS. 5A and 5B schematically illustrate a memory space 500 that includes objects having overlapping lifetimes, e.g., object being alive during concurrent allocation/deallocation times that does not have the memory space 500 optimized or maximized for memory usage. As illustrated in FIG. 5A, in an example embodiment, three objects, 502a, 502b, 502c may be arranged, moved, or placed in the memory space 500 for memory usage, e.g., scheduling/assignment, along a memory address range and time range. Object 502a may have a size of 36 bytes, object 502b may have a size of 10 bytes, and object 502c may have a size of 36 bytes. If object 502b having a size of 10 bytes is placed between objects 502a and 502c both having a size of 36 bytes, after deallocation of the objects, the memory space is separated into two ranges, until the 10 bytes of object 502b are deallocated. As such, when there is an object 502d, e.g., having a 72-byte object request, as schematically illustrated in FIG. 5B, only the memory space of object 502c having 36-bytes may be reused, and the memory space of object 502a having 36-bytes may not be reused until object 502b is allocated/deallocated. Thus, since the memory space 500 of FIGS. 5A and 5B may have separate memory ranges, in which one of the memory address may not be accessed or reused, memory fragmentation may be formed, which increases the memory address range for the objects.

Figures 6A, 6B:
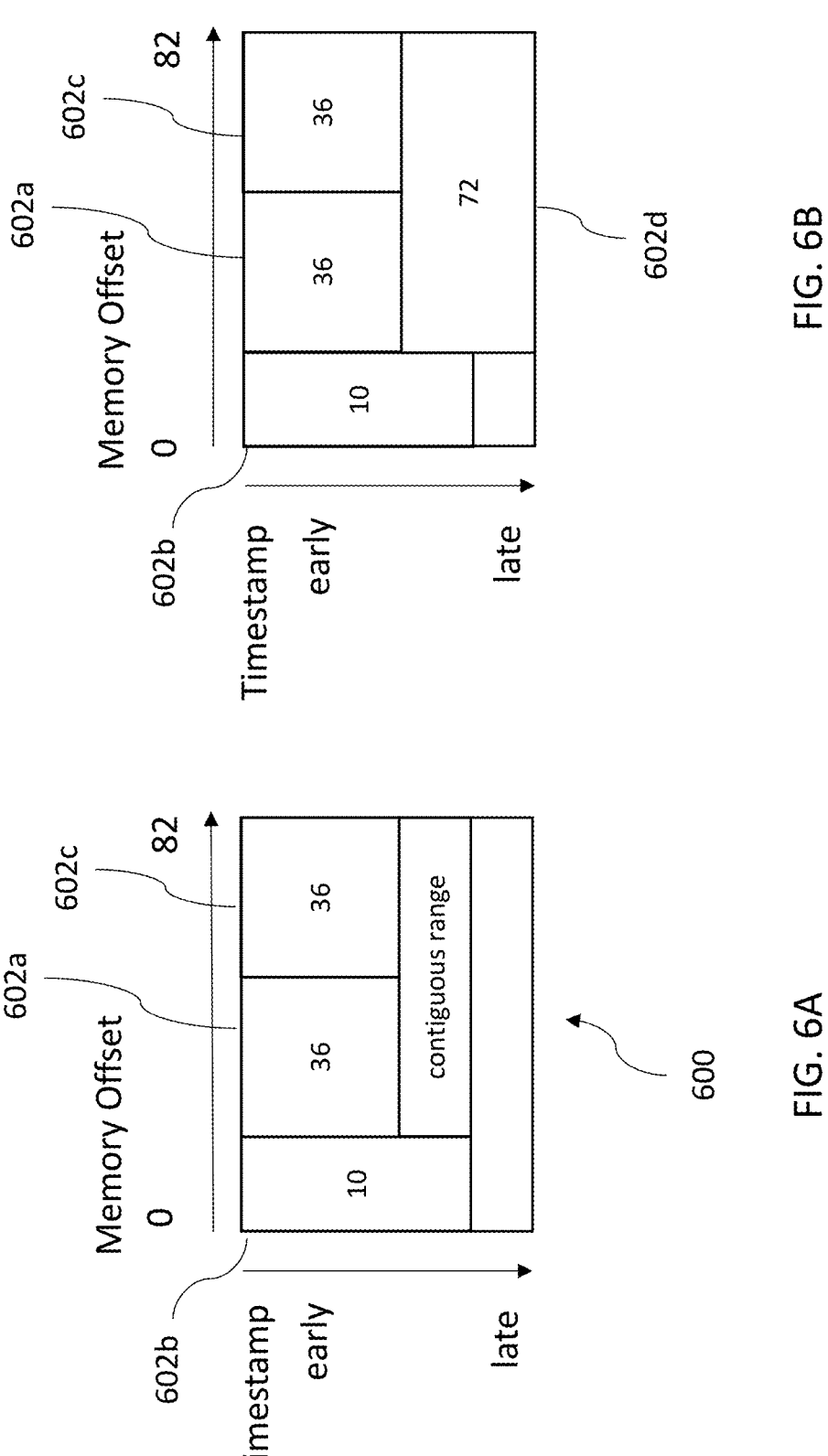
FIGS. 6A and 6B are schematic illustrations of a memory space including objects with overlapping lifetimes that are arranged using a profiling-based memory allocation algorithm, in accordance with at least some embodiments described herein.

On the other hand, as schematically illustrated in FIGS. 6A and 6B, when a profiling-based memory allocation algorithm, e.g., a parallel ladder algorithm, as discussed herein, is applied to arrange, rearrange, move, or place the objects in the memory space 600, memory fragmentation may be avoided or reduced. For example, in an embodiment, as illustrated in FIG. 6A, if object 602b (which may correspond to object 502b of FIGS. 5A and 5B) is rearranged, moved, or swapped such that the objects with similar deallocation timestamps, e.g., objects 602a and 602c, are positioned next to each other, a contiguous memory range may be available. That is, by using or applying the processing flow having the profiling-based memory allocation algorithm to rearrange, move, or swap the objects in the memory space, after deallocations of objects 602a and 602c, a contiguous memory may be provided for subsequent object allocations, e.g., for object 602d needing a 72-byte continuous memory range. As such, unlike in the embodiment of FIGS. 5A, 5B, the availability of a contiguous memory address may be available in the memory space 600 for reuse, e.g., for object 602d and reuse of 72-byte continuous/contiguous memory, which may avoid memory fragmentation, even if object 602b is not deallocated. Further embodiments are discussed below.

FIGS. 7A-7I schematically illustrate a method for managing memory usage by using a profiling-based memory allocation algorithm, according to an example embodiment, in which the scheduling or assignment of the memory space includes a memory offset (X-axis), in which the memory address range may be determined, and timestamp (Y-axis), in which start/end positions for the allocations/deallocations are schematically illustrated in the vertical direction.

Figures 7A, 7B:
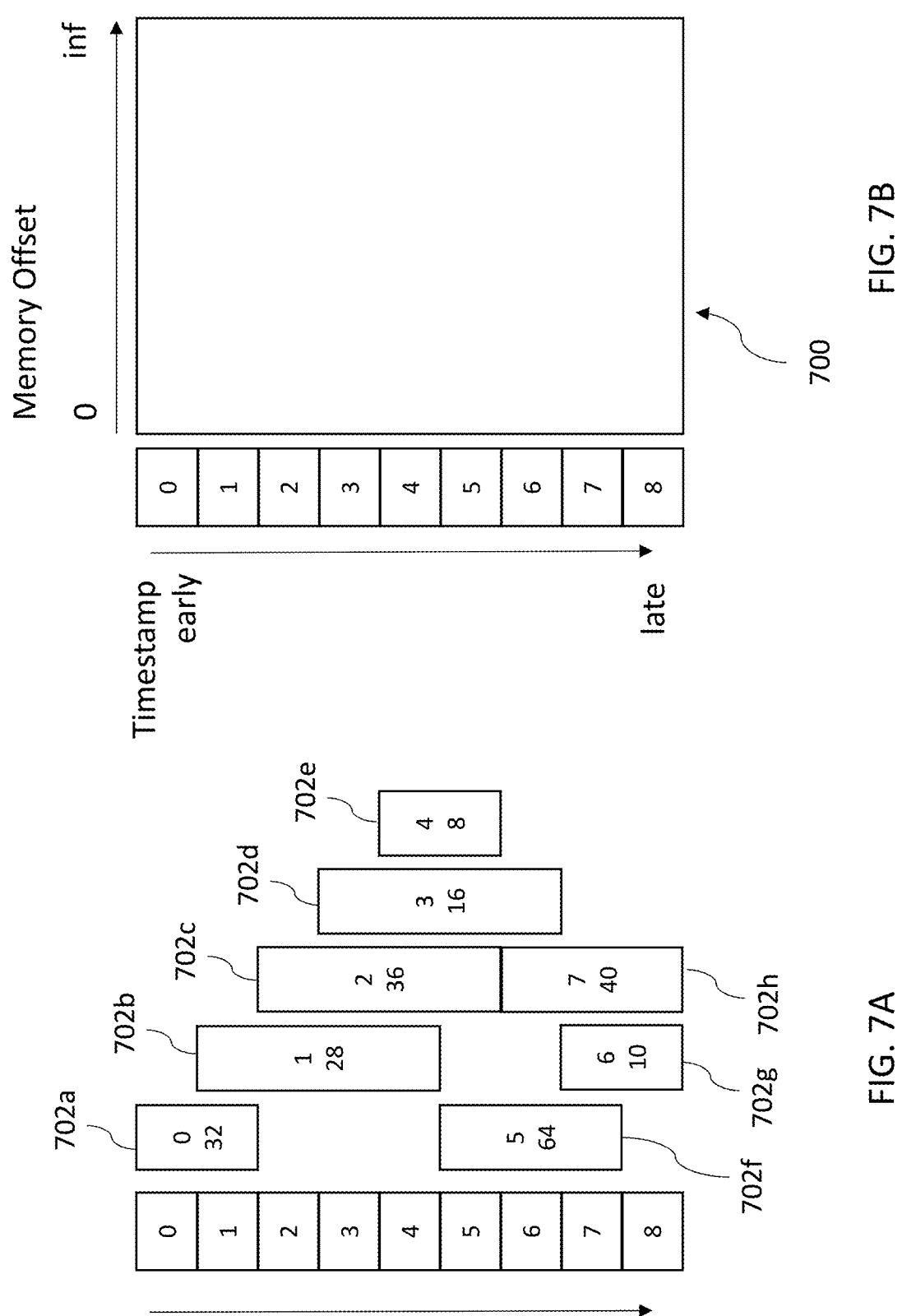

Initially, as illustrated in FIG. 7A, the method may include receiving a batch of objects for a single or first training step or allocation, e.g., a forward operation and/or backward operation, for a data learning operation. In an embodiment, the batch of objects may include eight objects 702a, 702b, 702c, 702d, 702e, 702f, 702g, 702h. The method may further include a profiling step to gather or obtain the detailed information or data of each object 702a, 702b, 702c, 702d, 702e, 702f, 702g, 702h allocated in the first training step, e.g., of the one or more objects in the batch of objects. The gathered or obtained information or data (e.g., the profiling results from the profiling execution) may be utilized to guide memory allocation (and assignment) during the scheduling step or phase, e.g., by grouping one or more objects into one or more groups, and/or to guide the placement or arrangement of one or more objects inside the memory space for the GPU memory or inside the CPU memory of the device for scheduling (or assignment) of the objects, e.g., based on memory address ranges, allocation timestamps, deallocation timestamps, or the like. In an example embodiment, the gathered or obtained information or data in the profiling step or phase may include one or more of object size, e.g., of the one or more objects or each of the objects in the batch of objects; object allocation timestamps and deallocation timestamps (e.g., execution sequence), e.g., to determine whether any objects may overlap (conflict) during the execution step or phase; lifetime of the object, e.g., ordinary object or long-lived object; and/or stages (forward or backward, and the model layer being executed) when the object is allocated or deallocated.

In an embodiment, the profiling results from the profiling step or phase may include object 702a having a size of 32 bytes with an allocation timestamp of 0 and deallocation timestamp of 1, object 702b having a size of 28 bytes with an allocation timestamp of 1 and deallocation timestamp of 4, object 702c having a size of 36 bytes with an allocation timestamp of 2 and deallocation timestamp of 5, object 702d having a size of 16 bytes with an allocation timestamp of 3 and deallocation timestamp of 6, object 702e having a size of 8 bytes with an allocation timestamp of 4 and deallocation timestamp of 5, object 702f having a size of 64 bytes with an allocation timestamp of 5 and deallocation timestamp of 7, object 702g having a size of 10 bytes with an allocation timestamp of 7 and deallocation timestamp of 8, and object 702h having a size of 40 bytes with an allocation timestamp of 6 and deallocation timestamp of 8.

In some embodiments, the profiling-based memory allocation algorithm is designed, programmed, or otherwise configured to arrange the objects 702a, 702b, 702c, 702d, 702e, 702f, 702g, 702h for scheduling (or assignment) in the memory space 700, as illustrated in FIG. 7B, to maximize memory usage (or reduce memory consumption) with a reduced computational overhead, in which the resulting allocation information, e.g., scheduling or assignment of objects, may also further reduce the computational overhead by reducing the number of allocations in the scheduling step or phase.

Figures 7C, 7D:
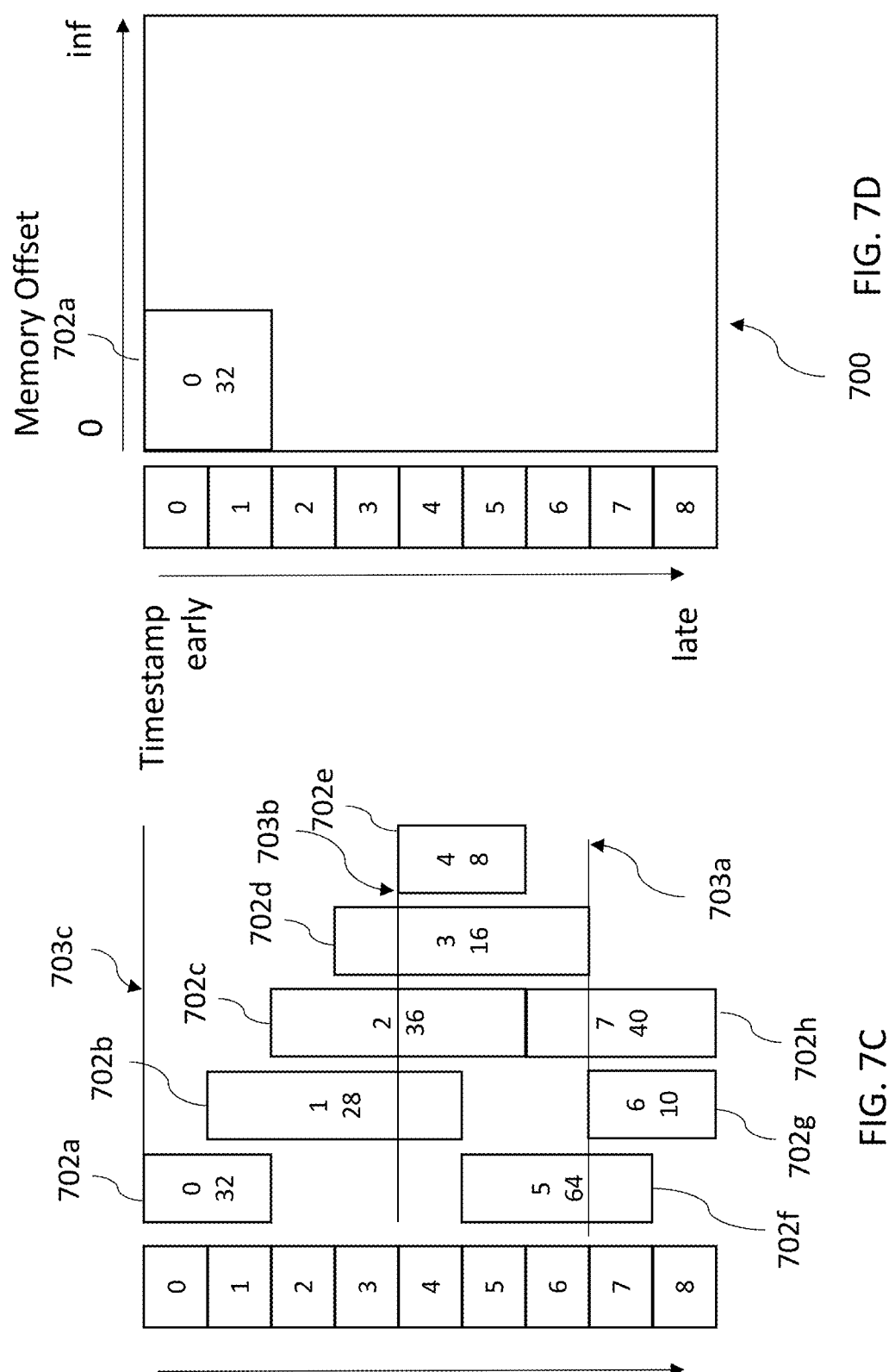

As illustrated in FIG. 7C, at an initial step, the profiling-based memory allocation algorithm is designed, programmed, or otherwise configured to group objects based on aliveness of the last allocation object, e.g., object with the latest allocation timestamp. For example, in an embodiment, based on the allocation timestamp of object 702g, the aliveness of other objects may be determined. That is, since object 702g has an allocation timestamp, for example, at time 7, the other objects that have an allocation timestamp and deallocation timestamp overlapping time 7 are determined. As such, objects 702f and 702h are identified or determined to have an aliveness during the aliveness of object 702g, and are grouped together, e.g., group 703a. Similarly, based on the next allocation object, that is the object(s) with the latest allocation timestamp after removing the objects in the first group 703a, e.g., object 702e, having an allocation timestamp, for example, at time 4, the other objects that have an allocation timestamp and deallocation timestamp overlapping time 4 are determined. As such, objects 702b, 702c, and 702d are identified or determined to have an aliveness during the aliveness of object 702e and are grouped together, e.g., group 703b. Lastly, object 702a is grouped as group 703c, as no remaining objects are alive during the aliveness of object 702a that have not already been grouped. As such, one or more objects, e.g., from a batch of objects or data batch, may be grouped into one or more groups based on the memory allocation timestamps, such that the one or more objects are provided in descending order with respect to the memory address range in which the object having the earliest memory allocation timestamp (of the one or more groups) is placed, provided, or arranged at the further right (e.g., greatest memory offset) for accommodating the objects from the one or more groups of objects.

As illustrated in FIG. 7D, at a next step, the profiling-based memory allocation algorithm is designed, programmed, or otherwise configured to arrange, move, or place the objects into the memory space 700 for scheduling (or assignment). In an embodiment, the group of objects 703a, 703b, 703c may be arranged, moved, or placed based on the earliest allocation timestamps. For example, since object 702a of group 703c has an earliest allocation timestamp, e.g., time 0, group 703c may be arranged, moved, or placed by placing object 702a at offset 0 in the memory space 700, e.g., having an address range of [0, 32), from timestamp 0 to 1. In some embodiments, the objects of the group may be rearranged, moved, or swapped by considering deallocation timestamps to maximize memory usage by reducing or minimizing the combined memory address range for the group. Since in this case, group 703c only includes one object, the objects are not rearranged, moved, or swapped based on the deallocation timestamps.

Figure 7E:
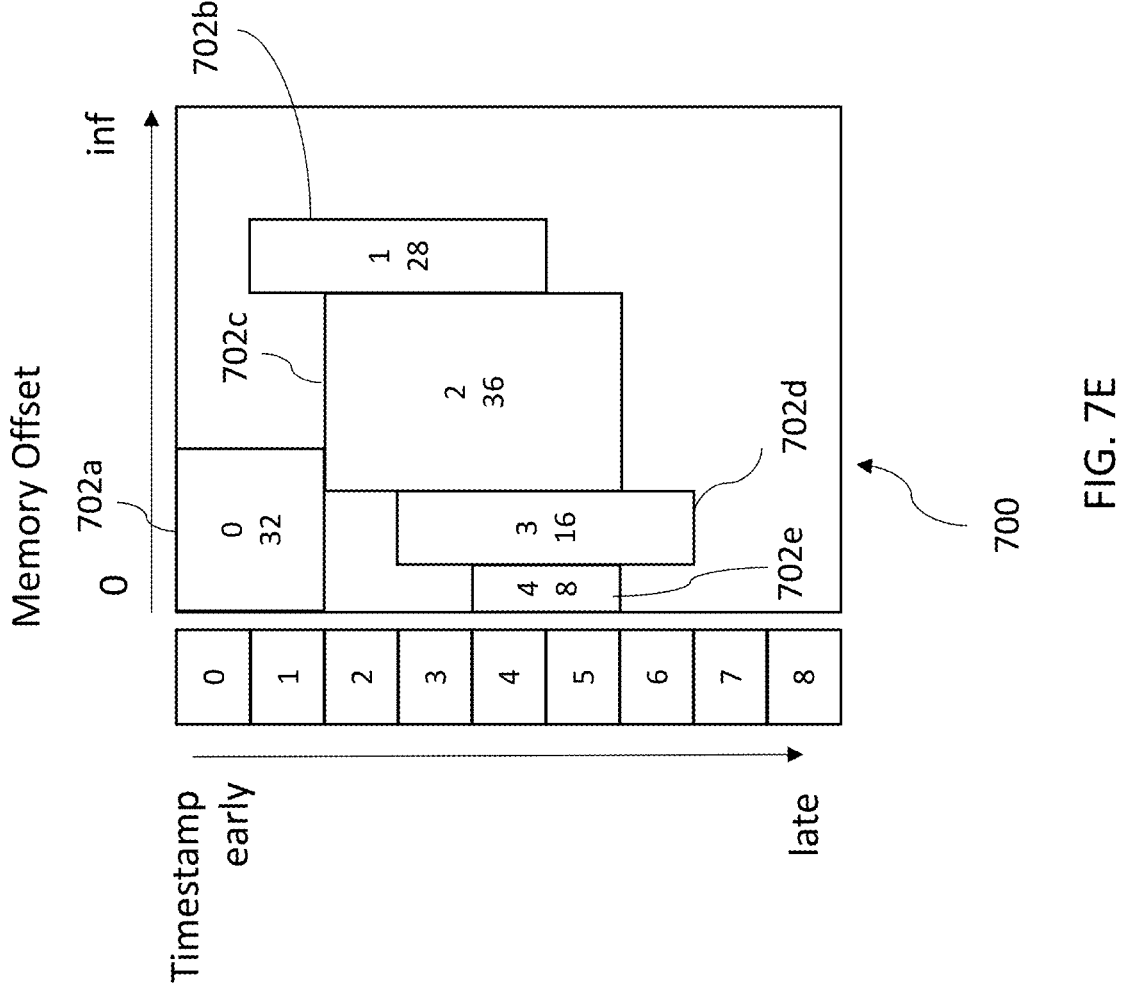

FIG. 7E illustrates the profiling-based memory allocation algorithm being designed, programmed, or otherwise configured to arrange, move, or place the objects into the memory space 700 of the next group 703b based on the allocation timestamps in descending order from a first value to a second value in the memory space 700. In an embodiment, the objects, which may include two or more objects, e.g., objects 702b, 702c, 702d, 702e may be arranged, moved, or placed in the memory space 700 based on their allocation timestamps. That is, object 702b may be arranged, moved, or placed at a right-most position in the memory space 700, e.g., the greatest memory offset to accommodate the group of objects in group 703b in the memory space at the first value in the memory space, since object 702b has the earliest allocation timestamp, e.g., timestamp 1 to 4. Next, object 702c may be arranged, moved, or placed next to or adjacent to the left of object 702b in the memory space from timestamp 2 to 5 at a second value, since object 702c has a later allocation timestamp. Object 702d may then be arranged, moved, or placed next to or adjacent to the left of object 702c in the memory space at a third value from timestamp 3 to 6 (since object 702d has a later allocation timestamp), and subsequently object 702e may arranged, moved, or placed next to or adjacent to the left of object 702d from timestamps 4 to 5 at a fourth value (since object 702e has a latest allocation timestamp), based on their respective timestamps. That is, after the group of objects are arranged in the memory space based on allocation timestamps, subsequent groups of the one or more objects are arranged in descending order in the memory space from a first value (right-most position) to a second value (left-most position or at 0 memory offset), in which the object having the earliest memory allocation timestamp is provided at the first value and another object having a later memory allocation timestamp is provided at the second value.

Figures 7F, 7G:
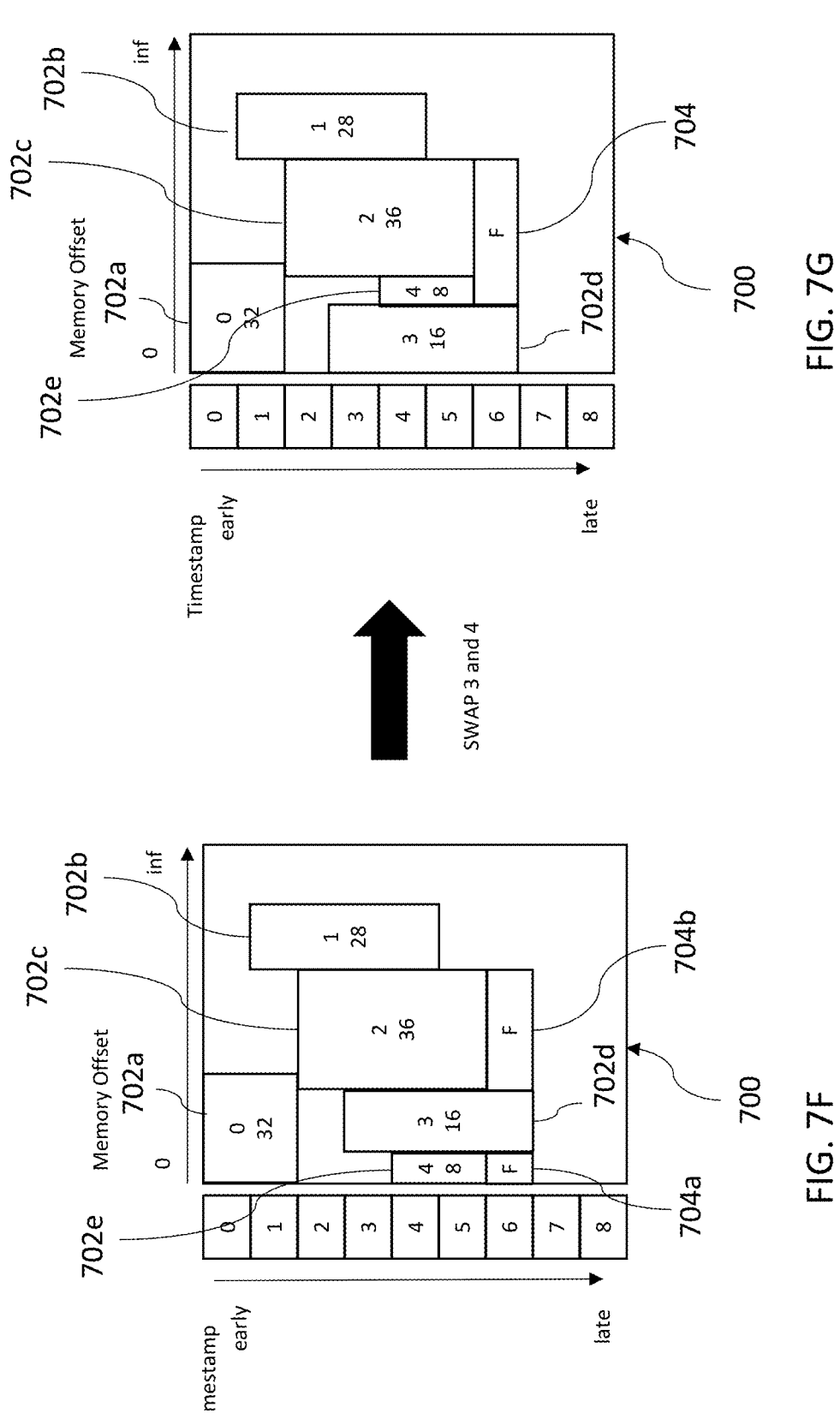

In some embodiments, to maximize memory usage (or minimize a combined memory address range for the memory space), two or more objects of the group may be rearranged, moved, or swapped by considering deallocation timestamps. In some embodiments, the profiling-based memory allocation algorithm may be designed, programmed, or otherwise configured to determine whether a deallocation of one of the objects in the batch of objects occurs after another one of the objects of the batch of objects and rearranging an order of the arranged batch of objects when the deallocation occurs such that the combined memory address range of the batch of objects is minimized between a first allocation timestamp and a last deallocation timestamp. For example, in an example embodiment, as illustrated in FIGS. 7F and 7G, since object 702d is placed to the right of object 702e, but has a later deallocation timestamp, memory fragmentations 704a and 704b may be present. As such, to reduce the memory fragmentation by combining fragments 704a and 704b as a contiguous memory, object 702d may be moved, positioned, or swapped with object 702e, since the moving, positioning, or swapping of object 702e would not conflict with other (prior) objects in the one or more other groups, e.g., memory space usage based on allocation/deallocation timestamps and memory address ranges. As such, object 702d may be moved, positioned, or swapped and placed to the left of object 702e and at an offset 0 (at the second value), and object 702e may be placed at offset 16 to maximize memory usage in which memory fragmentations 704a, 704b are combined to form free space 704. Thus, objects 702b, 702c, 702d, 702e may be rearranged to minimize the size of the memory space, e.g., the combined memory address range, between the object 702b with the first (or earliest) allocation timestamp and object 702d with the last deallocation timestamp.

Figure 7H:
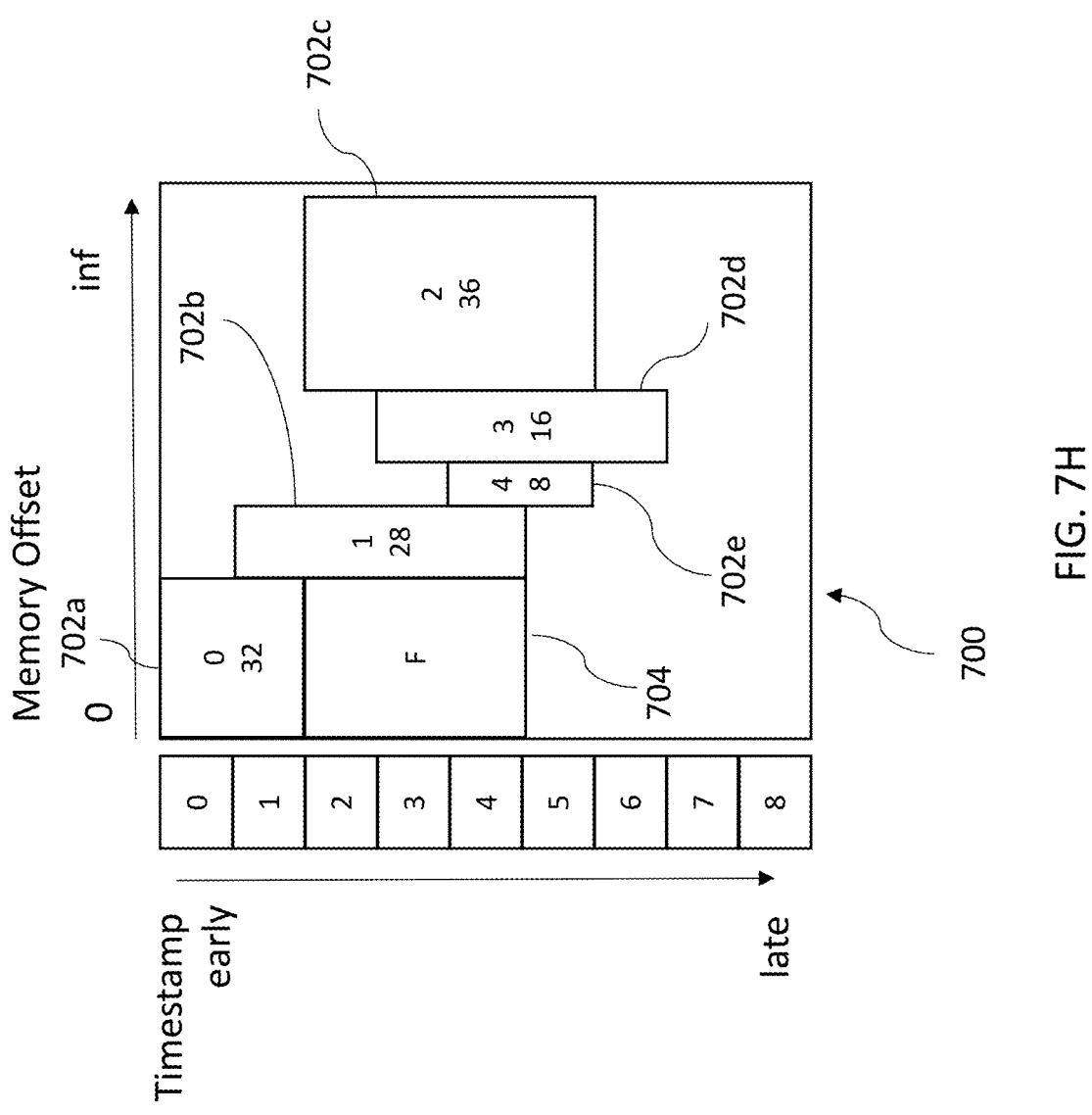
Figure 71:
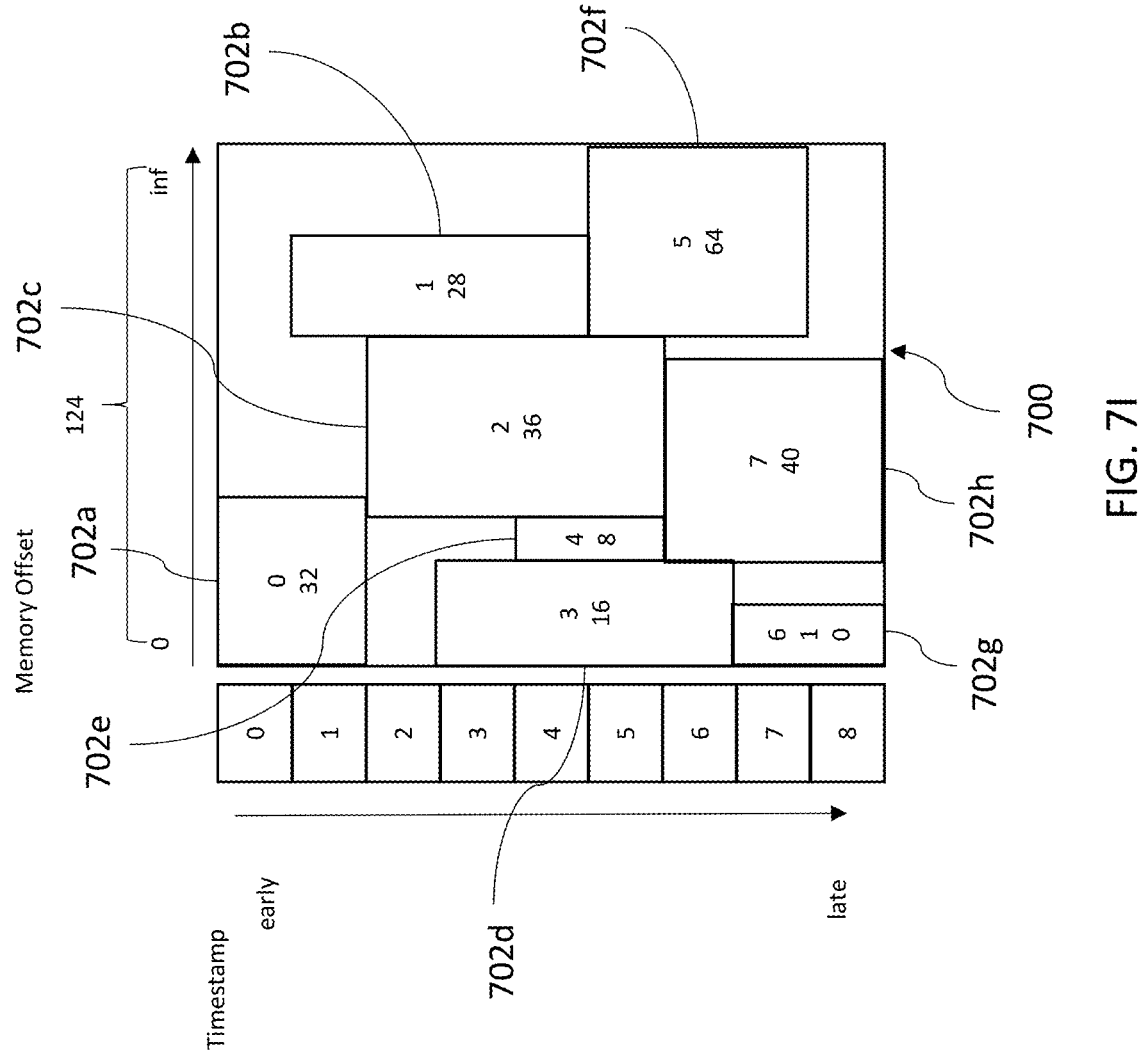

On the other hand, when the profiling-based memory allocation algorithm is not used, as seen in FIG. 7H, object 702b may be initially placed next to object 702a, in which memory fragmentation 704 may be provided or present between object 702a and object 702b, as object 702c cannot be placed in the memory space due to the time conflict of object 702c, e.g., memory size required at allocation time 2. As such, object 702c may be arranged, moved, or placed after object 702b such that more memory may be used for the memory space than the method of memory usage using the profiling-based memory allocation algorithm, as discussed herein.

Finally, as illustrated in FIG. 7I, after the arrangement, movement, or placement of the objects of groups 703a, 703b, the remaining objects 702f, 702g, 702h of group 703c may be sorted as objects 702g, 702h, 702f based on the allocation timestamps of the objects. Each of the objects may be pushed or moved to the left-most, if possible to maximize the memory address range of the objects in the memory space (with the corresponding allocation timestamps and deallocation timestamps), such that object 702g is placed at offset 0 (at timestamp 7 to 8), object 702h is placed at offset 16 (at timestamp 6 to 8), and object 702f is placed at offset 60 (at timestamp 5 to 7), e.g., in which the memory usage may not be minimized based on the allocation timestamps for the objects. In some embodiments, since objects 702f, 702g, 702h are already sorted by their deallocation order, the object may not need to be moved, positioned, or swapped. As such, since object 702f may be located in the memory space at the memory address range of [60, 125), the total memory size used by the groups 703a, 703b, 703c is 124 bytes, and may be arranged or stored in a 124-byte memory chunk for scheduling memory usage and/or assignment thereof. Thus, every address range for the objects may be determined as following: object 702a: [0, 32), object 702b: [60, 88), object 702c: [24, 60), object 702d: [0, 16), object 702e: [16, 24), object 702f: [60, 124), object 702g: [0, 10), object 702h: [16, 56) at the respective timestamp ranges between 0 and 8.

FIG. 8 is a schematic structural diagram of an example computer system 800 applicable to implementing an electronic device (for example, one of the devices shown in FIG. 1), arranged in accordance with at least some embodiments described herein. It is to be understood that the computer system shown in FIG. 8 is provided for illustration only instead of limiting the functions and applications of the embodiments described herein.

As depicted, the computer system 800 may include a central processing unit (CPU) or a graphic processing unit (GPU) 805. The CPU or GPU 805 may perform various operations and processing based on programs stored in a read-only memory (ROM) 810 or programs loaded from a storage device 840 to a random-access memory (RAM) 815. The RAM 815 may also store various data and programs required for operations of the system 800. The CPU or GPU 805, the ROM 810, and the RAM 815 may be connected to each other via a bus 820. An input/output (I/O) interface 825 may also be connected to the bus 820.

The components connected to the I/O interface 825 may further include an input device 830 including a keyboard, a mouse, a digital pen, a drawing pad, or the like; an output device 835 including a display such as a liquid crystal display (LCD), a speaker, or the like; a storage device 840 including a hard disk or the like; and a communication device 845 including a network interface card such as a LAN card, a modem, or the like. The communication device 845 may perform communication processing via a network such as the Internet, a WAN, a LAN, a LIN, a cloud, etc. In an embodiment, a driver 850 may also be connected to the I/O interface 825. A removable medium 855 such as a magnetic disk, an optical disk, a magneto-optical disk, a semiconductor memory, or the like may be mounted on the driver 850 as desired, such that a computer program read from the removable medium 855 may be installed in the storage device 840.

It is to be understood that the processes described with reference to the flowchart (or process) and/or algorithms of FIGS. 2-7I may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 845, and/or may be installed from the removable medium 855. The computer program, when being executed by the central processing unit (CPU) or the graphic processing unit (GPU) 805, can implement the above functions specified in the method in the embodiments disclosed herein.

Features in the embodiments disclosed herein may support data learning operations by reducing and/or optimizing memory consumption and/or reducing computational overhead for data learning operations, e.g., operations included in training a machine learning model, by improving the management of memory usage. The memory management mechanism as discussed herein may be used in deep learning architectures, for example, for natural language processing, computer vision, audio processing, multi-modal processing, generative pre-trained architectures, or directional encoder representations from transformers, in which during the training of machine learning models, input data, model parameters, forward activations, backward gradients, optimizer states, may use processing device memory.

Features in the embodiments disclosed herein may include the memory management mechanism that includes a profiling-based memory allocation algorithm that utilizes information about allocated objects, that is obtained in advance through profiling, for training machine learning parameters of the machine learning model. Such memory management mechanism may solve issues of existing solutions by reducing memory consumption by using the profiling to collect at least size, memory allocations and memory deallocations, e.g., via timestamps, of the objects for training the machine learning model. The memory management mechanism may further include a scheduling step that uses the profiled information to determine the size and address range of a memory allocation, e.g., block in the machine learning model, and subsequently the total consumption of memory usage, e.g., GPU memory, may be determined that is optimized to reduce memory consumption. The scheduling step may then be applied to any subsequent allocation, e.g., execution steps or blocks used for training the machine learning model. As such, not only may the memory allocation algorithm include memory management that may be optimized by reducing memory consumption, for example, by avoiding memory fragmentation, but also may reduce the computational overhead by applying the same allocation information or parameters for a single allocation (or block) for any subsequent allocation, e.g., execution steps or blocks for training the machine learning model. In some embodiments, the profiling-based memory allocation algorithm may be a parallel-ladder algorithm that is designed, programmed, or otherwise configured to balance memory consumption and computation complexity that results in less memory consumption as compared with existing sub-optimal algorithms.

As such, the methods and systems as discussed herein may have one or more of the following advantages:

Reduce computation overhead by exploiting similarities between layers or blocks of the machine learning model, e.g., models that utilize the transformer architecture; classifying objects as ordinary objects and long-lived objects, which may interfere with memory assignment; and grouping ordinary objects in small groups of objects at a time during a scheduling phase along with grouping the long-lived objects in separate groups during the scheduling phase.

Reduce memory consumption by ordering objects based on allocation timestamps and deallocation timestamps to optimize the assignment of the objects based on allocations/deallocations to maximize memory usage.

Reduce "out of memory" (OOM) occurrences and/or memory waste by using a suboptimal memory allocation algorithm that is designed, programmed, or otherwise configured to balance the computation overhead and memory consumption, for example, by managing objects in terms of memory blocks, and freeing the memory blocks back to the processing device as necessary for optimized memory assignment.

Avoidance of memory fragmentation by reusing (releasing) memory as a contiguous memory space to maximize memory availability, e.g., for larger object sizes. For example, if a contiguous memory space is not available, once the first object is deallocated, its space may not be immediately reused if an adjacent object is still active, e.g., memory fragmentation.

Balance computational overhead and memory consumption by using a suboptimal memory allocation algorithm or process that applies allocation information for one block to other blocks for training the machine learning model, e.g., for a significant number of allocations in which the size and the address of each allocation does not have to be determined.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method of managing memory usage in a data learning operation, the method comprising: profiling one or more objects used for training the data learning operation, wherein the profiling includes determining an object size, a memory allocation timestamp, and a memory deallocation timestamp of the one or more objects; and scheduling the memory usage for the one or more objects to determine a total size and address range for one or more groups of the one or more objects, wherein the scheduling includes: grouping the one or more objects into the one or more groups based on the memory allocation timestamp and/or the memory deallocation timestamp of the one or more objects, and arranging the one or more objects in the one or more groups in descending order in a memory space, wherein, when the one or more objects includes two or more objects, the two or more objects are provided in the descending order from a first value to a second value, that is less than the first value, in the memory space, wherein one of the two or more objects having an earliest memory allocation timestamp is provided at the first value and an other object of the two or more objects having a later memory allocation timestamp is provided at the second value.

Aspect 2. The method of Aspect 1, further comprising training an operation in the data learning operation based on the scheduling of the memory usage.

Aspect 3. The method of any of Aspects 1-2, wherein the scheduling of the memory usage further includes rearranging the two or more objects in the one or more groups based on the deallocation timestamps of the two or more objects such that one of the two objects having a later deallocation time is moved to maximize memory usage.

Aspect 4. The method of Aspect 3, wherein the one of the two objects is moved to eliminate or reduce any gap in a memory offset.

Aspect 5. The method of any of Aspects 1-4, wherein the data learning operation is based on a transformer architecture, wherein the profiling occurs on a forward stage of the training of the data learning operation and the profiling is only performed on a first block for the forward stage, and wherein allocation information for the one or more blocks during the scheduling is determined for the first block for the forward stage and is applied to any remaining blocks for the forward stage for the training of the data learning operation.

Aspect 6. The method of any of Aspects 1-5, wherein the data learning operation is based on a transformer architecture, wherein the profiling occurs on a backward stage of the training of the data learning operation and the profiling is only performed on a first block for the backward stage, and wherein allocation information for the one or more blocks during the scheduling that is determined for the first block for the backward stage is applied to any remaining blocks for the backward stage for the training of the data learning operation.

Aspect 7. The method of any of Aspects 5-6, wherein during training of the data learning operation, for each allocation request, the size, the memory allocation timestamp, and the memory deallocation timestamp of the one or more objects determined during the profiling is used to map any corresponding objects in each allocation request.

Aspect 8. The method of any of Aspects 1-7, wherein the profiling further includes determining a lifetime of the one or more objects, wherein the determining of the lifetime includes classifying objects as ordinary objects or long-lived objects based on the memory allocation timestamp and the memory deallocation timestamp, and wherein the scheduling includes grouping the ordinary objects and grouping the long-lived objects and scheduling the group of ordinary objects and the group of long-live objects.

Aspect 9. A method of managing memory usage in a data learning operation, comprising: profiling a batch of objects, each of the objects including a size, an allocation timestamp, and a deallocation timestamp; arranging the profiled batch of objects in a memory space to form a combined memory address range corresponding to the batch of objects; wherein the arranging includes determining, based on the deallocation timestamp, whether a deallocation of one object of the batch of objects occurs after another one of the objects of the batch of objects, and rearranging an order of the arranged batch of objects when the deallocation occurs such that memory usage for the combined memory address range of the batch of objects is maximized for the batch of objects in the memory space.

Aspect 10. The method of Aspect 9, wherein the arranging the profiled batch of objects includes arranging the batch of objects according to the allocation timestamp, wherein the batch of objects are provided in descending order a first value to a second value, that is less than the first value in the memory space, wherein one object of the batch of objects having an earliest memory allocation timestamp is provided at the first value and an other object of the group of objects having a later memory allocation timestamp is provided at the second value.

Aspect 11. The method of any of Aspects 9-10, wherein the data learning operation is based on a transformer architecture, wherein the profiling occurs on a forward stage of the training of the data learning operation and the profiling is only performed on a first block for the forward stage, and wherein allocation information for the one or more blocks during the scheduling is determined for the first block for the forward stage and is applied to any remaining blocks for the forward stage for the training of the data learning operation.

Aspect 12. The method of any of Aspects 9-11, wherein the data learning operation is based on a transformer architecture, wherein the profiling occurs on a backward stage of the training of the data learning operation and that the profiling is only performed on a first block for the backward stage, and wherein allocation information for the one or more blocks during the scheduling that is determined for the first block for the backward stage is applied to any remaining blocks for the backward stage for the training of the data learning operation.

Aspect 13. The method of any of Aspects 11-12, wherein during training of the data learning operation, for each allocation request, the size, the memory allocation timestamp, and the memory deallocation timestamp of the one or more objects determined during the profiling is used to map any corresponding objects each allocation request.

Aspect 14. A data learning operation training system, the system comprising: a memory to store a data learning operation; at least one processor to: profile one or more objects used for training in the data learning operation, wherein the profiling includes determining an object size, a memory allocation timestamp, and a memory deallocation timestamp of the one or more objects; and schedule a memory usage for the one or more objects to determine a total size and address range for one or more groups of the one or more objects, wherein scheduling includes: grouping the one or more objects into the one or more groups based on the memory allocation timestamp and/or the memory deallocation timestamp of the one or more objects, and arranging the one or more objects in the one or more groups in descending order in a memory space, wherein, when the one or more objects includes two or more objects, the two or more objects are provided in the descending order from a first value to a second value, that is less than the first value, in the memory space, wherein one of the two or more objects having an earliest memory allocation timestamp is provided at the first value and an other object of the two or more objects having a later memory allocation timestamp is provided at the second value.

Aspect 15. The system of Aspect 14, further comprising a graphics processing unit.

Aspect 16. The system of any of Aspects 14-15, wherein the at least one processor is configured to further train an operation in the data learning operation based on the scheduling of the memory usage.

Aspect 17. The system of any of Aspects 14-16, wherein the schedule of the memory usage further includes rearranging the two or more objects in the one or more groups based on the deallocation timestamps of the two or more objects such that one of the two objects having a later deallocation time is moved to maximize memory usage.

Aspect 18. The system of any of Aspects 14-17, wherein the data learning operation is based on a transformer architecture, wherein the profile occurs on a forward stage of the training of the data learning operation and the profile is only performed on a first block for the forward stage, and wherein allocation information for the one or more blocks during the scheduling that is determined for the first block for the forward stage and is applied to any remaining blocks for the forward stage for the training of the data learning operation.

Aspect 19. The system of any of Aspects 14-18, wherein the data learning operation is based on a transformer architecture, wherein the profile occurs on a backward stage of the training of the data learning operation and the profile is only performed on a first block for the backward stage, and wherein allocation information for the one or more blocks during the scheduling that is determined for the first block for the backward stage is applied to any remaining blocks for the backward stage for the training of the data learning operation.

Aspect 20. The system of any of Aspects 14-19, wherein the profile further includes determining a lifetime of the one or more objects, wherein the determining of the lifetime includes classifying objects as ordinary objects or long-lived objects based on the memory allocation timestamp and the memory deallocation timestamp, and wherein the scheduling includes grouping the ordinary objects and grouping the long-lived objects, and scheduling the group of ordinary objects and the group of long-lived objects.

Aspect 21. A non-transitory computer-readable medium having computer-executable instructions stored thereon, the instructions, upon execution, cause one or more processors to perform operations include profiling one or more objects used for training in the data learning operation, wherein the profiling includes determining an object size, a memory allocation timestamp, and a memory deallocation timestamp of the one or more objects; and scheduling the memory usage for the one or more objects to determine a total size and address range for one or more groups of the one or more objects, wherein the scheduling includes: grouping the one or more objects into the one or more groups based on the memory allocation timestamp and/or the memory deallocation timestamp of the one or more objects, and arranging the one or more objects in the one or more groups in descending order in a memory space, wherein, when the one or more objects includes two or more objects, the two or more objects are provided in the descending order from a first value to a second value, that is less than the first value, in the memory space, wherein one of the two or more objects having an earliest memory allocation timestamp is provided at the first value and an other object of the two or more objects having a later memory allocation timestamp is provided at the second value.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of managing memory usage in a data learning operation, the method comprising:

profiling one or more objects of training data used for training in the data learning operation, wherein the profiling includes determining an object size, a memory allocation timestamp, and a memory deallocation timestamp of the one or more objects; and scheduling memory usage for the one or more objects to determine a total size and address range for one or more groups of the one or more objects, wherein the scheduling includes:

grouping the one or more objects into the one or more groups based on at least one of the memory allocation timestamp or the memory deallocation timestamp of the one or more objects, arranging the one or more objects in the one or more groups in descending order in a memory space based on one or more values of the one or more objects, wherein, when the one or more objects includes two or more objects, the one or more values include a first value and a second value, that is less than the first value, wherein one of the two or more objects having an earlier memory allocation timestamp is provided at the first value and another object of the two or more objects having a later memory allocation timestamp is provided at the second value, and rearranging the two or more objects in the one or more groups based on the memory deallocation timestamps of the two or more objects such that one of the two or more objects having a later deallocation time is moved to manage memory usage.

2. The method of claim 1, further comprising:

training an operation in the data learning operation based on the scheduling of the memory usage.

3. The method of claim 1, wherein the one of the two or more objects is moved to eliminate or reduce any gap in a memory offset.

4. The method of claim 1, wherein the data learning operation is based on a transformer architecture, wherein the profiling occurs on a forward stage of the training of the data learning operation and the profiling is only performed on a first block for the forward stage, and wherein allocation information for one or more blocks during the scheduling is determined for the first block for the forward stage and is applied to any remaining blocks for the forward stage for the training of the data learning operation.

5. The method of claim 1, wherein the data learning operation is based on a transformer architecture, wherein the profiling occurs on a backward stage of the training of the data learning operation and the profiling is only performed on a first block for the backward stage, and wherein allocation information for one or more blocks during the scheduling that is determined for the first block for the backward stage is applied to any remaining blocks for the backward stage for the training of the data learning operation.

6. The method of claim 4, wherein during training of the data learning operation, for each allocation request, the object size, the memory allocation timestamp, and the memory deallocation timestamp of the one or more objects determined during the profiling is used to map any corresponding objects in each allocation request.

7. The method of claim 1, wherein the profiling further includes determining a lifetime of the one or more objects, wherein the determining of the lifetime includes classifying objects as ordinary objects or long-lived objects based on the memory allocation timestamp and the memory deallocation timestamp, and wherein the scheduling includes grouping the ordinary objects and grouping the long-lived objects, and scheduling the group of ordinary objects and the group of long-lived objects.

8. A data learning operation training system, the system comprising:

a memory to store a data learning operation;

at least one processor to:

profile one or more objects of training data used for training in the data learning operation, wherein the profiling includes determining an object size, a memory allocation timestamp, and a memory deallocation timestamp of the one or more objects; and schedule a memory usage for the one or more objects to determine a total size and address range for one or more groups of the one or more objects, wherein scheduling includes:

grouping the one or more objects into the one or more groups based on at least one of the memory allocation timestamp or the memory deallocation timestamp of the one or more objects, arranging the one or more objects in the one or more groups in descending order in a memory space based on one or more values of the one or more objects, wherein, when the one or more objects includes two or more objects, the one or more values include a first value and a second value, that is less than the first value, wherein one of the two or more objects having an earlier memory allocation timestamp is provided at the first value and another object of the two or more objects having a later memory allocation timestamp is provided at the second value, and rearranging the two or more objects in the one or more groups based on the memory deallocation timestamps of the two or more objects such that one of the two or more objects having a later deallocation time is moved to manage memory usage.

9. The system of claim 8, further comprising a graphics processing unit.

10. The system of claim 8, wherein the at least one processor is configured to further train an operation in the data learning operation based on the scheduling of the memory usage.

11. The system of claim 8, wherein the data learning operation is based on a transformer architecture, wherein the profiling occurs on a forward stage of the training of the data learning operation and the profiling is only performed on a first block for the forward stage, and wherein allocation information for one or more blocks during the scheduling that is determined for the first block for the forward stage and is applied to any remaining blocks for the forward stage for the training of the data learning operation.

12. The system of claim 8, wherein the data learning operation is based on a transformer architecture, wherein the profiling occurs on a backward stage of the training of the data learning operation and the profiling is only performed on a first block for the backward stage, and wherein allocation information for one or more blocks during the scheduling that is determined for the first block for the backward stage is applied to any remaining blocks for the backward stage for the training of the data learning operation.

13. The system of claim 8, wherein the profiling further includes determining a lifetime of the one or more objects, wherein the determining of the lifetime includes classifying objects as ordinary objects or long-lived objects based on the memory allocation timestamp and the memory deallocation timestamp, and wherein the scheduling includes grouping the ordinary objects and grouping the long-lived objects, and scheduling the group of ordinary objects and the group of long-lived objects.

* * * * *